United States Patent [19]
Woodruff

[11] Patent Number: 5,487,579
[45] Date of Patent: Jan. 30, 1996

[54] PICKER MECHANISM FOR DATA CARTRIDGES

[75] Inventor: Daniel J. Woodruff, Lyons, Colo.

[73] Assignee: Exabyte Corporation, Boulder, Colo.

[21] Appl. No.: 112,260

[22] Filed: Aug. 26, 1993

[51] Int. Cl.$^6$ .................................................. B66C 1/42
[52] U.S. Cl. ........................... 294/115; 294/907; 414/753; 901/35; 901/39
[58] Field of Search .................................... 294/907, 115, 294/116, 106; 414/751, 753; 901/38, 39, 35

[56] References Cited

U.S. PATENT DOCUMENTS

| | | | |
|---|---|---|---|
| 2,118,991 | 5/1938 | Turechek et al. | 901/38 X |
| 3,353,860 | 11/1967 | Meissner | 294/115 X |
| 3,370,213 | 2/1968 | Rose | 294/106 X |
| 3,534,993 | 10/1970 | Le Vesque, Sr. | 294/106 X |
| 3,620,095 | 11/1971 | Dane | 294/115 X |
| 3,718,362 | 2/1973 | Butz | 294/106 X |
| 4,299,532 | 11/1981 | Bouwmeester | 294/116 X |
| 4,730,861 | 3/1988 | Spencer | 294/907 X |
| 4,972,277 | 11/1990 | Sills et al. | |
| 4,984,106 | 1/1991 | Herger et al. | |
| 5,056,844 | 10/1991 | Takabayashi | 294/106 |
| 5,059,772 | 10/1991 | Younglove | |
| 5,103,986 | 4/1992 | Marlowe | |
| 5,226,779 | 7/1993 | Yeakley | 414/753 |
| 5,237,467 | 8/1993 | Marlowe | |

OTHER PUBLICATIONS

"EXB-10 Cartridge Handling Subsystem", Product Description and Specification, published by EXABYTE Corporation, Boulder, Colorado, Feb. 1992.

"ACL5480 Automated Tape Library", Product Description, published by ODETICS, Anaheim, California.

Primary Examiner—Donald W. Underwood
Attorney, Agent, or Firm—Nixon & Vanderhye

[57] ABSTRACT

A picker mechanism (80) selectively grips and transports a data storage cartridge (62) in an automated library (30). The picker mechanism (80) has a picker frame (400) comprised of two half shell members (402, 404). Substantially all active elements of the picker are mounted to a base half shell (402) over which a cover half shell (404) mates for enclosing substantially all active picker elements. The active picker elements include a pair of gripper fingers (406) pivotally mounted to the picker frame. Each gripper finger (406) has a portion thereof configured to engage a data storage cartridge. The picker frame also carries a displacement path (e.g., leadscrew 418) along which a carriage member (e.g., leadscrew nut 426) travels. A motor (414) is provided for driving the carriage member (426) along the displacement path. A pair of biasing springs (432), one for each gripper finger (406), are provided for biasing the gripper fingers in a direction toward the displacement path. Also provided for each gripper finger is a linkage element (428). Driving the carriage member (426) along the displacement path causes the gripper fingers (426) to pivot between a cartridge engagement position to a cartridge release position, as well as a cartridge shove position.

7 Claims, 25 Drawing Sheets

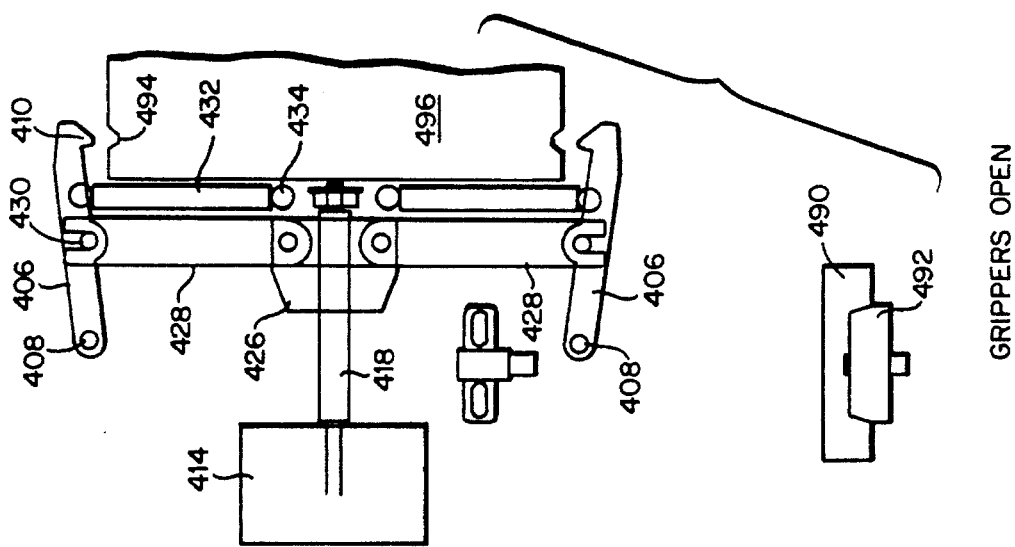
FIG. 23 GRIPPERS OPEN
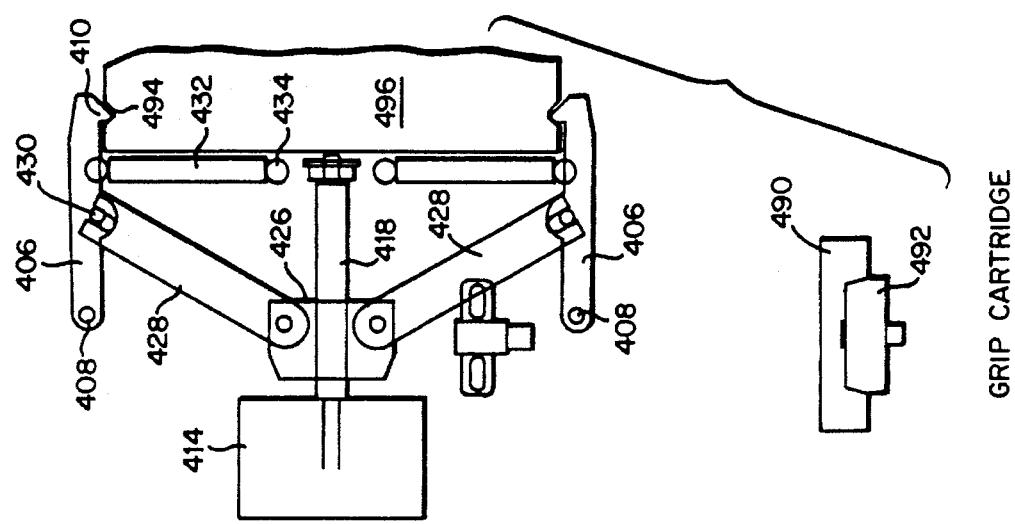
FIG. 22 GRIP CARTRIDGE
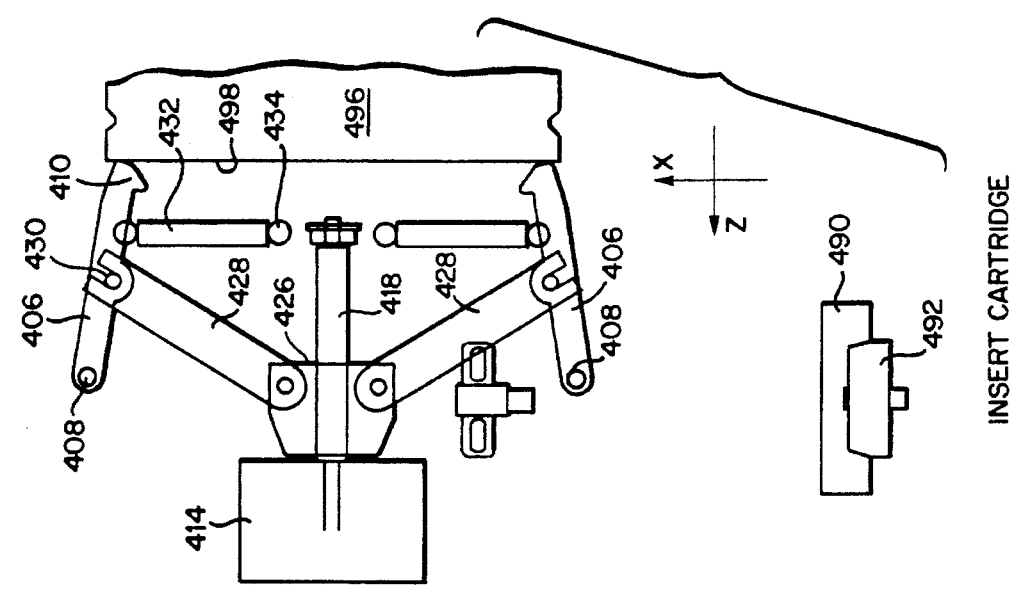
FIG. 21 INSERT CARTRIDGE

PICKER MECHANISM FOR DATA CARTRIDGES

BACKGROUND

1. Field of Invention

This invention pertains to picker mechanisms for handling units of data storage medium, such as magnetic tape cartridges.

2. Related Art and Other Considerations

Magnetic tape cartridges have proven to be an efficient and effective medium for data storage, including computer back-up. Large computer systems can utilize numerous cartridges for storage purposes, and may require a plurality of drives for inputting/outputting data to the cartridges. To this end, automated libraries for cartridges have been proposed. The following United States patents, all commonly assigned herewith and incorporated herein by reference, disclose various configurations of automated cartridge libraries, as well as subcomponents thereof (including cartridge engagement/transport mechanisms and storage racks for housing cartridges):

- U.S. Pat. No. 4,984,106 to Herget et al., entitled "CARTRIDGE LIBRARY SYSTEM AND METHOD OF OPERATION THEREOF";
- U.S. Pat. No. 4,972,277 to Sills et al., entitled "CARTRIDGE TRANSPORT ASSEMBLY AND METHOD OF OPERATION THEREOF";
- U.S. Pat. No. 5,059,772 to Younglove, entitled "READING METHOD AND APPARATUS FOR CARTRIDGE LIBRARY";
- U.S. Pat. No. 5,103,986 to Marlowe, entitled "CARTRIDGE RACK"; and,
- U.S. Pat. No. 5,237,467 to Marlowe, entitled "CARTRIDGE HANDLING APPARATUS AND METHOD WITH MOTION-RESPONSIVE EJECTION".

In general, cartridge libraries should optimize storage capacity and yet be as compact as possible. Moreover, such libraries must provide a reliable mechanism for engaging or gripping cartridges and for transporting cartridges between storage positions, the drives, and (when necessary) the user. Technical effort has been directed to developing libraries of enhanced performance.

Accordingly, it is an object of the present invention to provide an efficient and reliable automated cartridge library.

SUMMARY

A picker mechanism selectively grips and transports a data storage cartridge in an automated library. The picker mechanism has a picker frame comprised of two half shell members. Substantially all active elements of the picker are mounted to a base half shell over which a cover half shell mates for enclosing substantially all active picker elements.

The active picker elements include a pair of gripper fingers pivotally mounted to the picker frame. Each gripper finger has a portion thereof configured to engage a data storage cartridge. The picker frame also carries a displacement path (e.g., leadscrew) along which a carriage member (e.g., leadscrew nut) travels. A motor is provided for driving the carriage member along the displacement path. A pair of biasing springs, one for each gripper finger, are provided for biasing the gripper fingers in a direction toward the displacement path. Also provided for each gripper finger is a linkage element. Each linkage element has one end attached to the carriage member and a second end connected to its corresponding gripper finger. Driving the carriage member along the displacement path causes the gripper fingers to pivot between a cartridge engagement position to a cartridge release position, as well as a cartridge shove position.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 21 is a schematic view showing portions of the picker of FIG. 18 in an insert cartridge position.

FIG. 22 is a schematic view showing portions of the picker of FIG. 18 in a grip cartridge position.

FIG. 23 is a schematic view showing portions of the picker of FIG. 18 in a gripper open position.

DETAILED DESCRIPTION OF THE DRAWINGS

Figure 1:
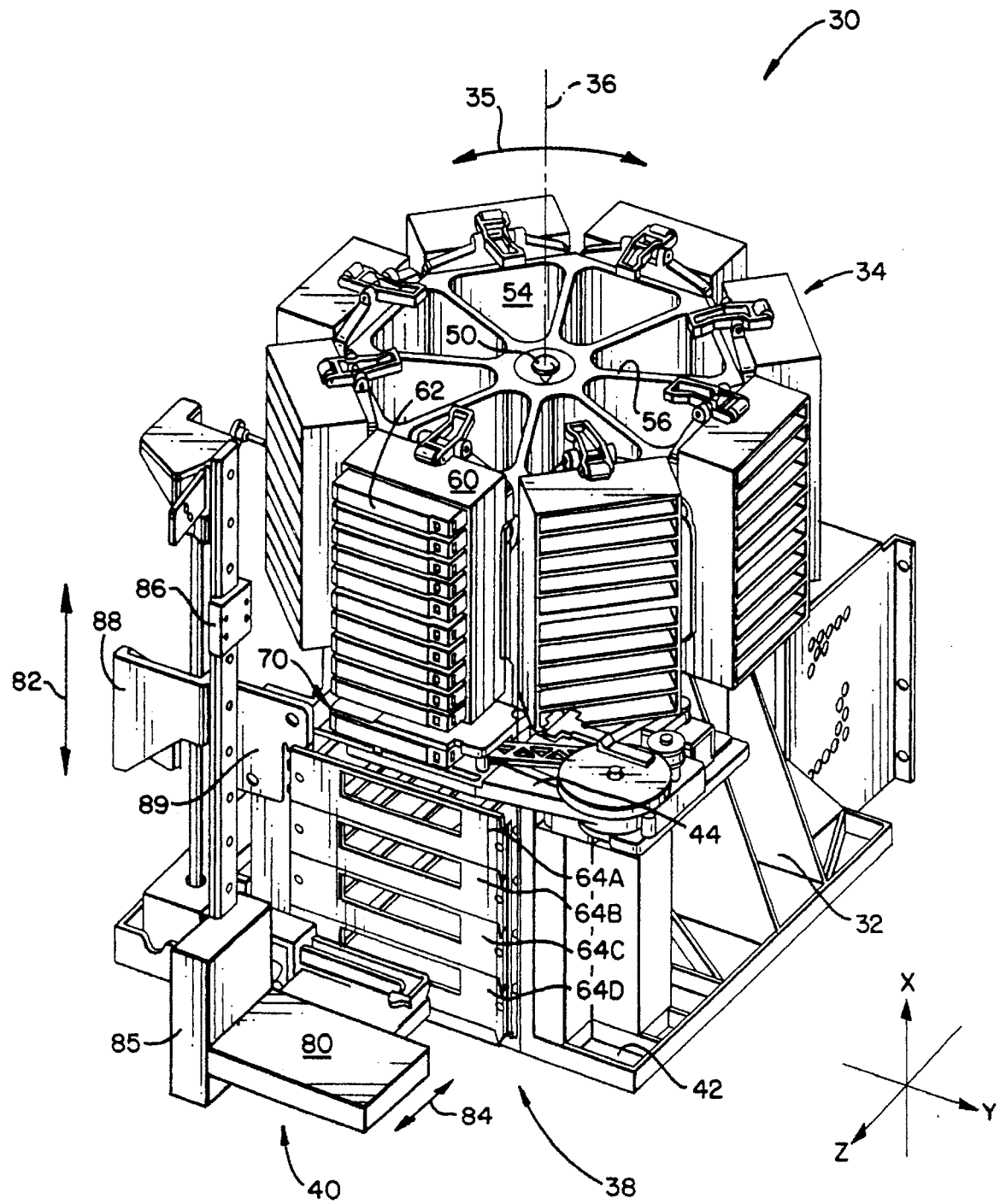
FIG. 1 is a front isometric view of a cartridge handling library according to an embodiment of the invention.

FIG. 1 shows portions of a cartridge handling library 30 of the invention. In general, library 30 includes a library frame 32, a drum-like member or hub 34 mounted on frame 32 for rotational motion (e.g., in the direction shown by arrow 35) about a drum or hub axis 36; a drive drawer rack 38 formed in frame 32; and, a cartridge transport assembly 40. Library frame 32 has a frame lower support surface 42 formed near its bottom and a frame upper support surface 44 provided at its top.

Figure 17:
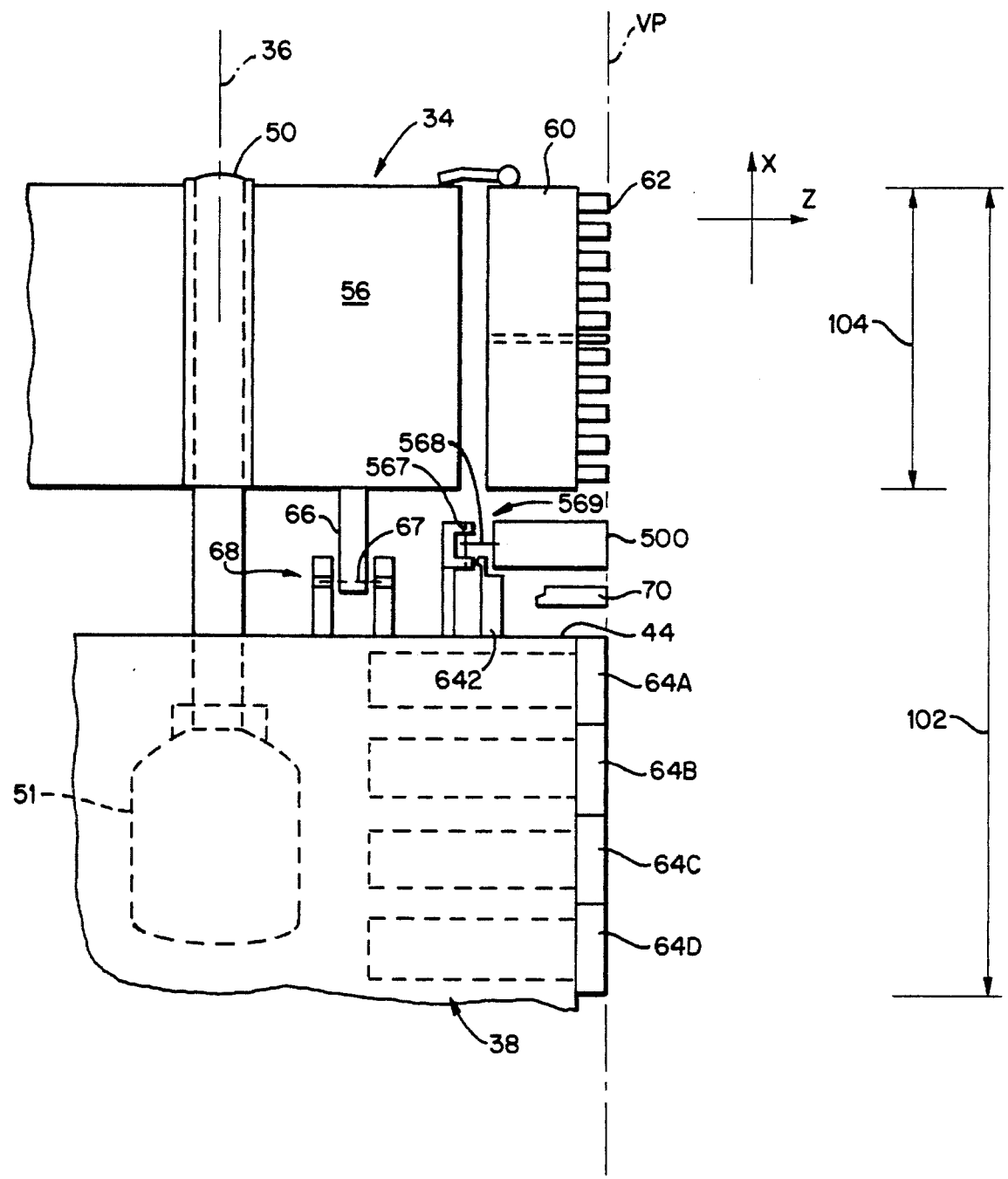
FIG. 17 is a schematic side view, partially cut-away of the library of FIG. 1.

Hub 34 is mounted above library frame 32 and has a hub central drive shaft 50 which is coupled to a DC motor 51 housed therebelow in library frame 32 (see FIG. 17). Hub 34 is octagonal in shape, having eight essentially planar peripheral faces 52, a back 54 of one of the planar faces being labeled in FIG. 1. Eight spokes 56 emanate from the center of hub 34 to hub faces 52. As explained in more detail hereinafter, hub faces 52 have cartridge racks 60 (also known as cartridge packs or receptacles) selectively mounted thereon.

In the illustrated embodiment, each cartridge rack 60 houses ten cartridges, cartridge 62 in FIG. 1 being labeled as indicative of a stored cartridge and being housed on an active face of hub 34. The cartridges are stored in racks 60 with the cartridge major dimensions lying in a unit orientation plane (the unit orientation plane being parallel to the horizontal in FIG. 1). The particular mounting of racks 60 to hub 34 is detailed below in connection with a discussion of FIGS. 4–7.

It should be understood that the library 30 can be scaled for cartridges of different sizes. Moreover, although the present discussion uses an 8 mm magnetic tape cartridge as an example, the invention is not limited to any particular type or size of medium. The term data storage unit or "unit" is used interchangeably herein for "cartridge", which is also known in the industry as "cassette".

In the illustrated embodiment, drive drawer rack 38 of frame 32 houses four drive drawers 64A–64D In the ensuing discussion, reference to "drawer 64" is a generic reference to any one of the drawers in drive drawer rack 38. Drive drawer rack 38 of library frame 32 is described in more detail below in connection with FIG. 8. FIG. 1 shows that drive drawer rack 38 is situated in the lower front portion of library frame 32. Thus, drive drawer rack 38 is located to an axial side of hub 34 (e.g., is vertically below hub 34). The drive drawers 64 are oriented so that a cartridge inserted therein has its major dimension parallel to the unit insertion plane (e.g., the horizontal).

The face 52 of hub 34 positioned above drive drawer rack 38 is denominated as the "active" hub face (the active hub face in FIG. 1 having the "active" rack labeled 60 mounted thereon). One of the spokes 56 referenced as a homing spoke has a sensor trip finger 66 depending therefrom, as seen in FIG. 17. When the homing spoke interrupts a beam 67 of a drum home sensor 68, library 30 knows that the homing spoke is at the drum home position. Library 30 thusly tracks the revolution of shaft 50 via the encoder on drum motor 51 and knows which face 52, and consequentially which rack 60, is in the "active" position. As shown in FIG. 17, drum home sensor 60 is mounted on frame upper support surface 44.

Figure 16:
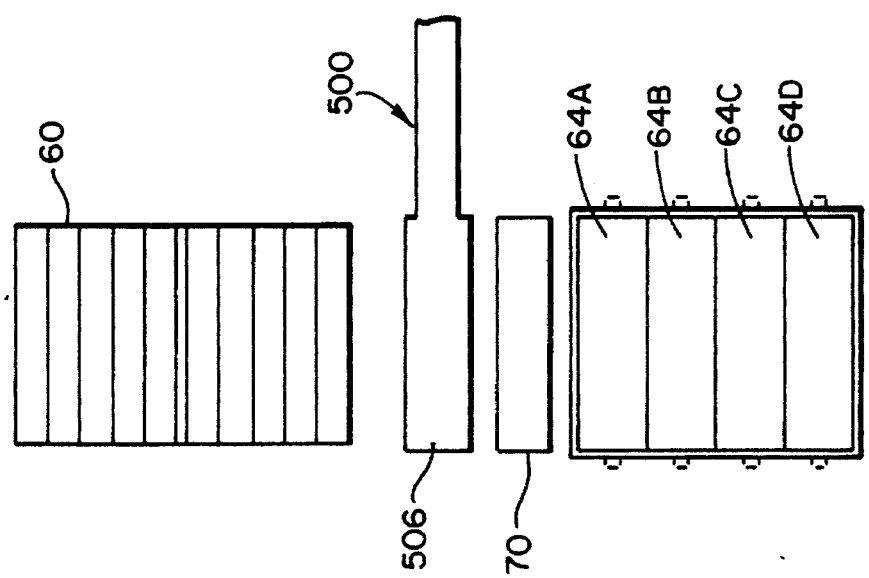
FIG. 16 is a schematic front view illustrating relative vertical positionings of a cartridge rack, an entry/exit transport device, a cartridge cleaning device, and a drive drawer rack portion of the library of FIG. 1.

A cartridge cleaner 70 is mounted on frame upper support surface 44, positioned vertically intermediate drive drawer rack 38 and active rack 60 (see FIGS. 16 and 17). In the illustrated embodiment, cleaner 70 is an Exabyte 8 mm Cleaning Cartridge dedicated to cleaning drives which handle the storage medium (e.g., magnetic tape) housed in the cartridges. As with the drives in drive drawer rack 38, cleaner 70 is oriented so that its major dimension lies parallel to the unit orientation plane (e.g., horizontal).

Cartridge transport assembly 40 includes a cartridge picker mechanism 80 (hereinafter also referred to as the "picker" or "end effector") which is displaced both in a vertical or "X" direction (e.g., along arrow 82 shown in FIG. 1) and in a picker approach/retreat direction or "Z" (e.g., along arrow 84 shown in FIG. 1). Details of picker 80 are hereinafter discussed with particular reference to FIGS. 18–24. Picker 80 is mounted upon a transfer base 85, which in turn is displaceable in the vertical direction along a linear bearing assembly 86. Linear bearing assembly 86 is anchored to frame upper support surface 44 by mounting block 88 (via mounting flange 89).

Picker 80 selectively moves a cartridge from the active cartridge rack 60 to a selected one of the drives in drive drawer rack 38. Conversely, picker 80 removes a cartridge from a designated one of the drives in driver drawer rack 38 and stores the removed cartridge in the active cartridge rack 60. By rotating hub 34, any one of the racks mounted on hub 34 can become the active rack (e.g., in a position directly above drive drawer rack 38). When necessary, picker 80 can extract the cleaner cartridge 70 for insertion into a drive.

In the above regard, FIGS. 1 and 17 show that exposed labeled faces of cartridges in active rack 60 lie essentially flush in a vertical plane VP with the front surface of the cleaner 70 and the front surface of the drives situated in drive drawer rack 38.

Figure 3:
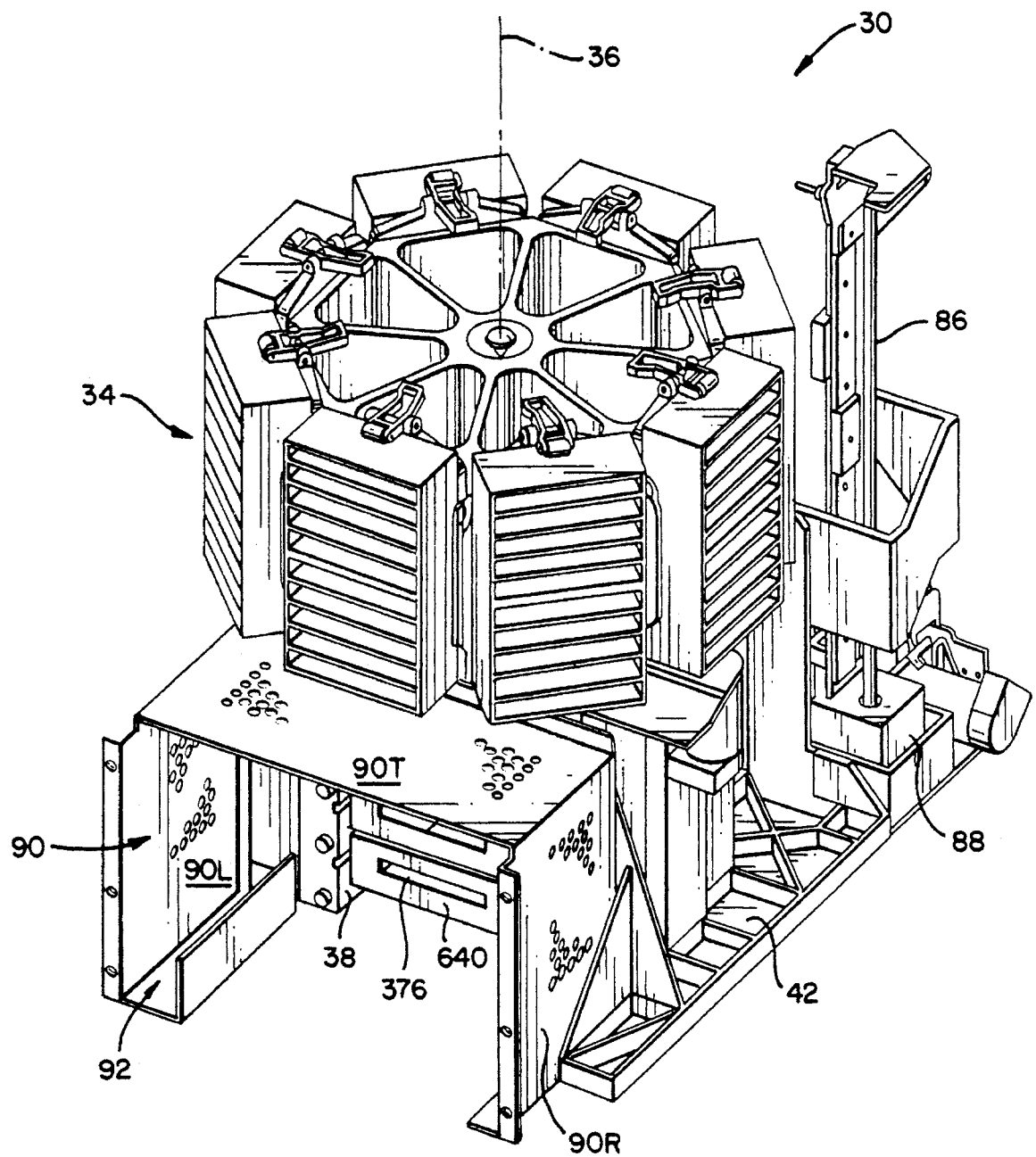
FIG. 3 is a rear left isometric view of the library of FIG. 1.
Figure 15:
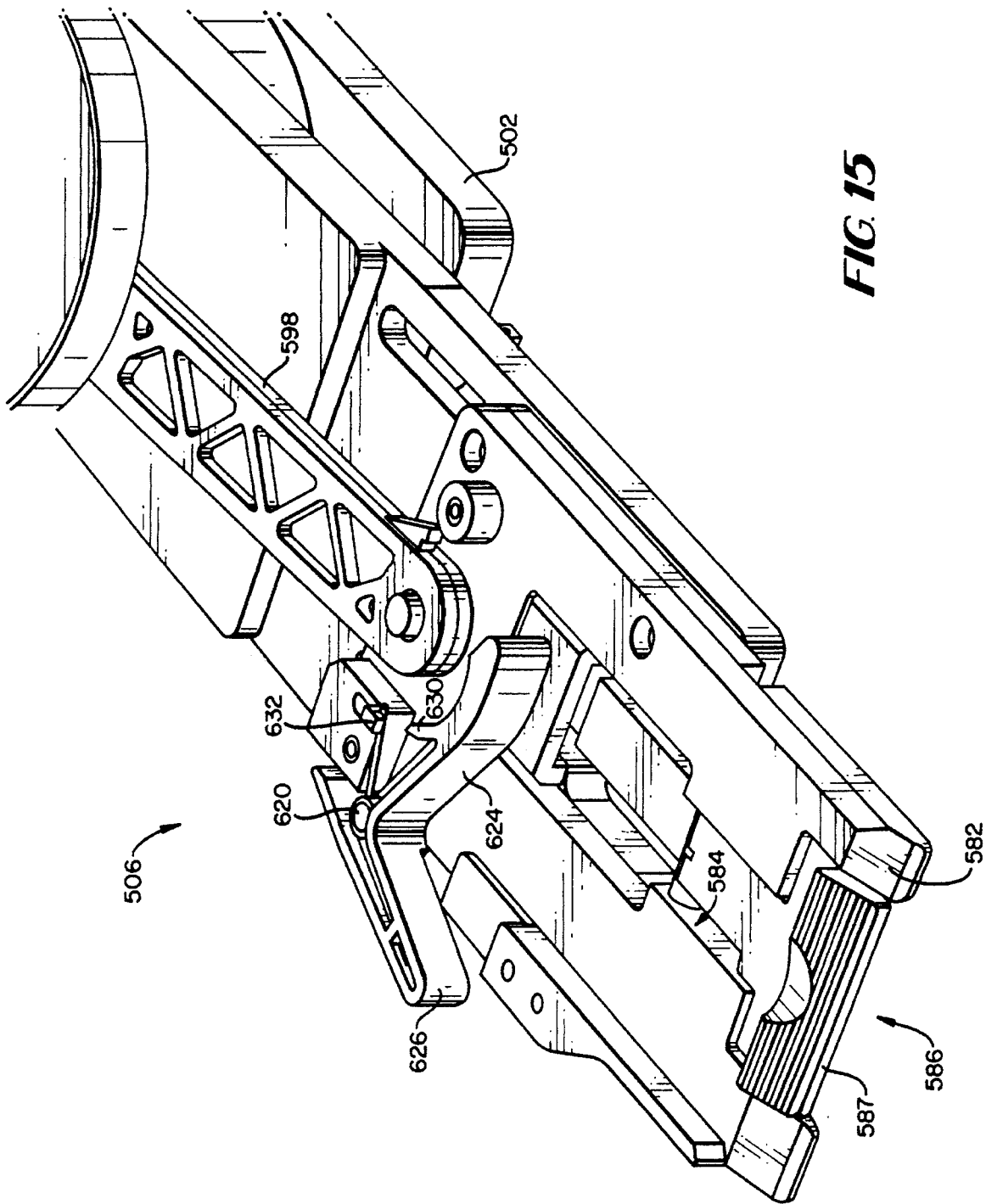
FIG. 15 is a detailed, partially cut-away, view of a cartridge handling device utilized in the library of FIG. 1.
Figure 25A:
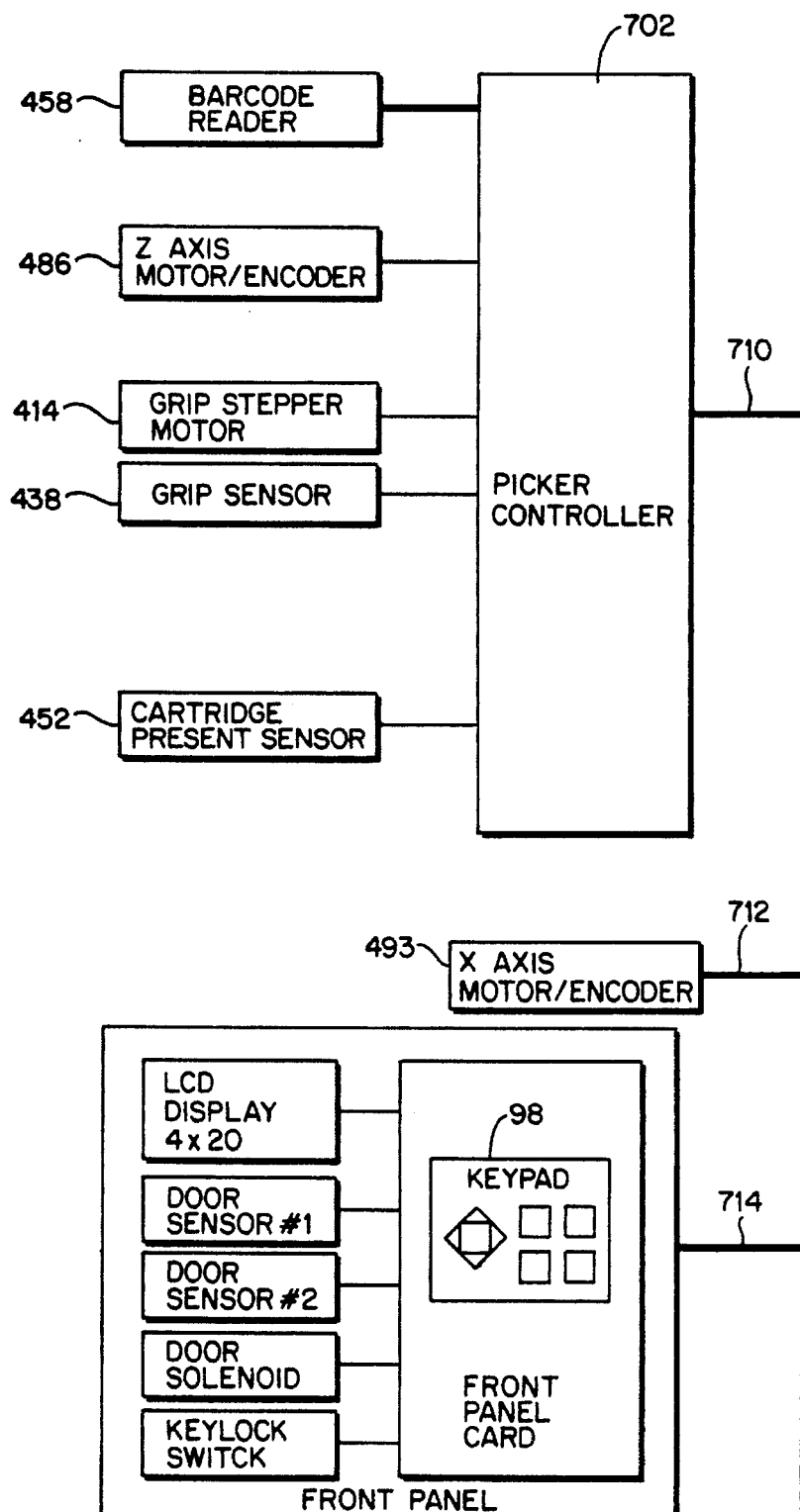
FIG. 25A and FIG. 25B are a schematic view of electronics included in the library of FIG. 1.
Figure 25B:
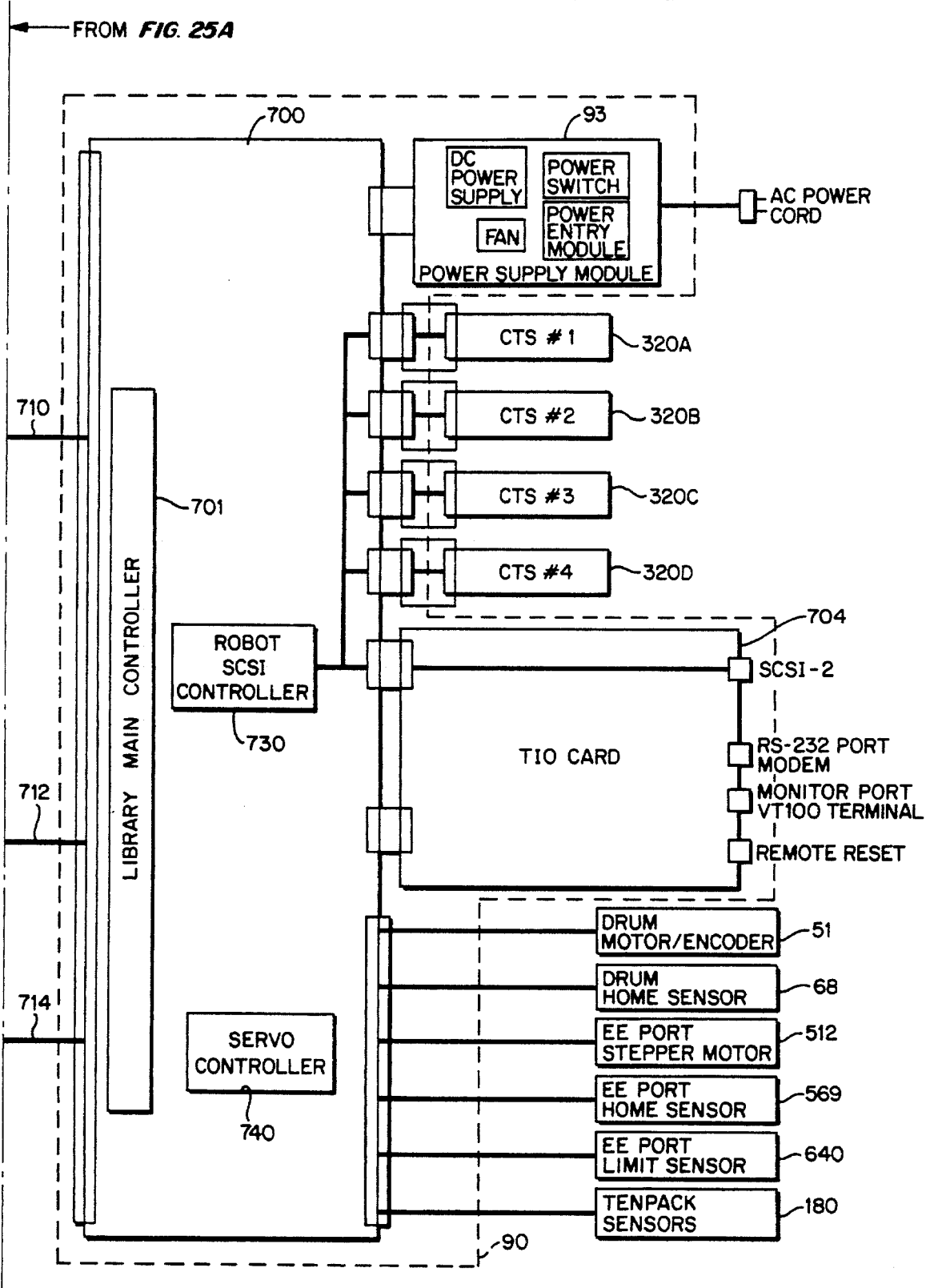

FIG. 3 shows library 30 from its rear, and particularly shows an electronics cage 90 mounted on the back of library frame 32. Electronics cage 90 has top surface, left side surface, and right side surface (90T, 90L, and 90R, respectively), as well as a cage shelf 92. Cage surfaces 90T, 90L, and 90R have ventilation holes formed therein. Electronics cage 90 accommodates electronic circuit boards (see FIG. 15) in a vertical position adjacent the back of drive drawer rack 38. In addition, as shown in FIGS. 25A and 25B, electronics cage 90 accommodates other devices including a power supply 93.

Figure 2:
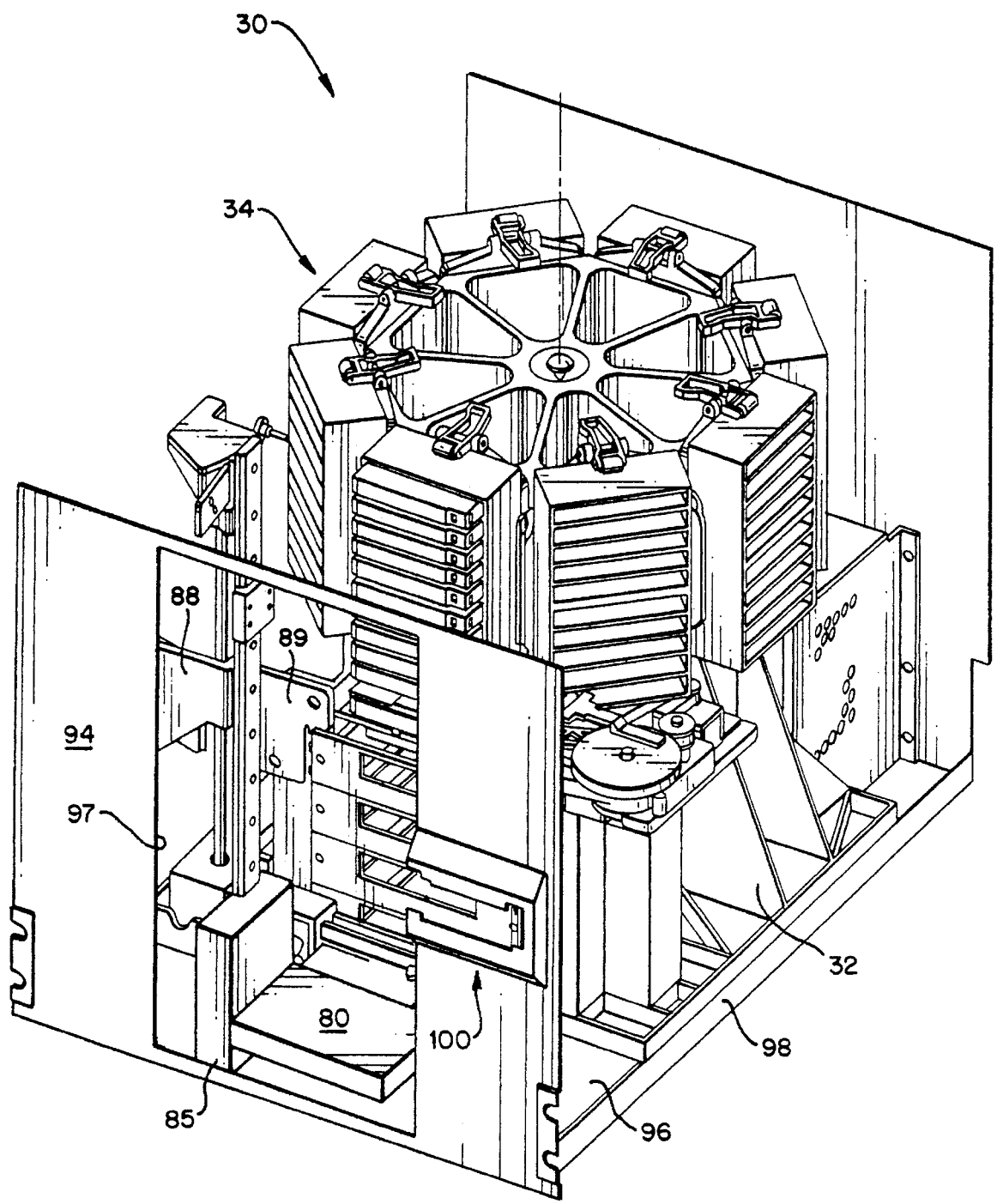
FIG. 2 is a front isometric view of the library of FIG. 1 further including a portion of a library housing.

FIG. 2 resembles FIG. 1, but in addition shows portions of a library housing including a housing front panel 94; a housing rear panel 95; and, a housing floor or bottom 96. Housing front panel 94 has an essentially transparent front window 97, a keypad 98 (see FIGS. 25A and 25B), and an entry/exit port 100. Entry/exit port 100 is positioned proximate a right edge of housing front panel 94 as seen in FIG. 2. Entry/exit port 100 includes a slot or aperture through which a cartridge can be introduced into or retrieved from the library 30 in a manner subsequently described.

As shown in FIG. 2, the library housing having front panel 94 has a length along the imaginary drum axis 36 which is on the order of about twice a length of hub 34 along the imaginary drum axis 36. Thus, although not shown to scale in FIG. 17, it should be understood that distance 102 is on the order of about twice the distance 104.

STRUCTURE: CARTRIDGE RACK MOUNTING

Figure 4:
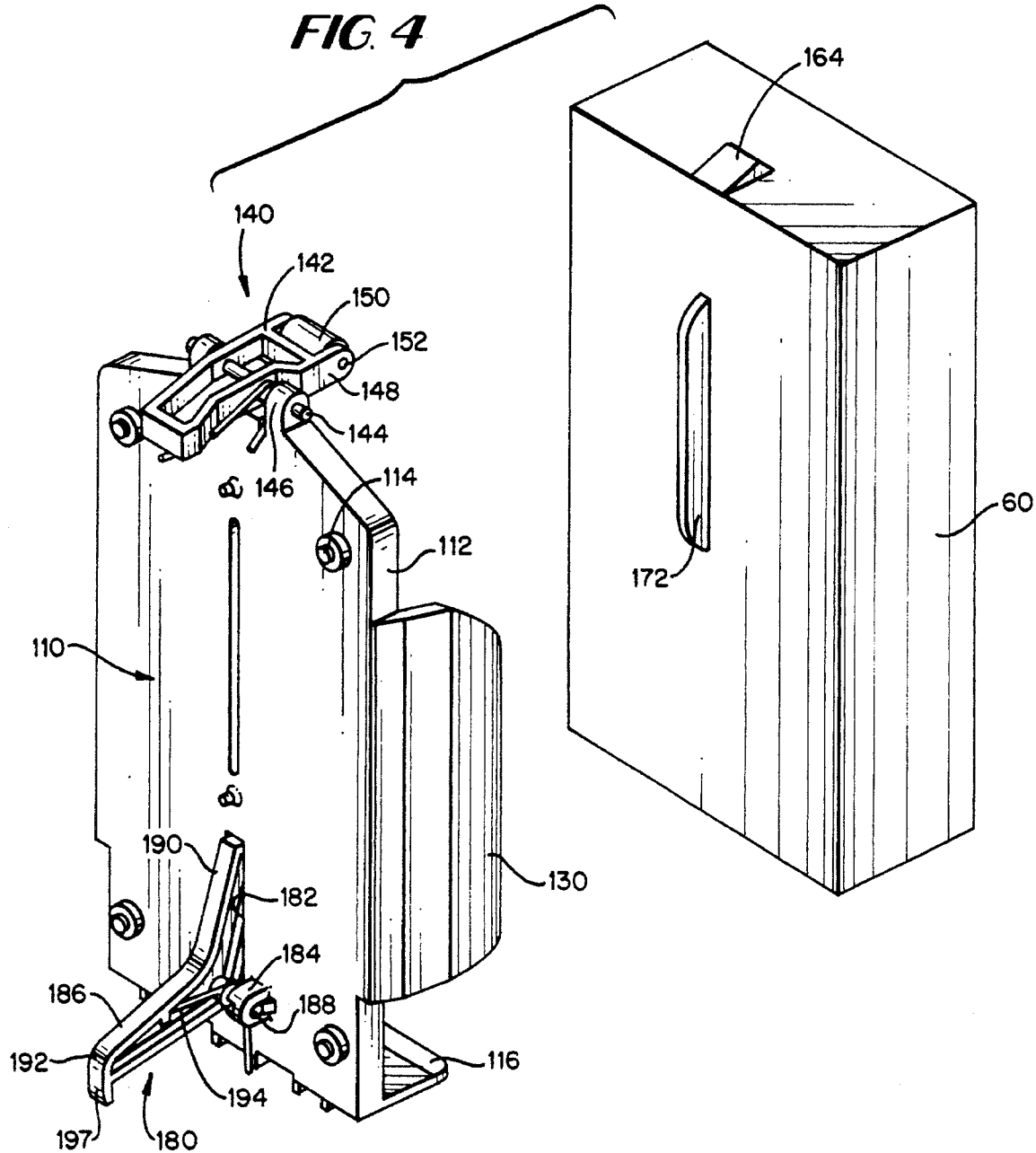
FIG. 4 is a rear isometric view of both a cartridge storage tray and a tray mount utilized in the library of FIG. 1.
Figure 5:
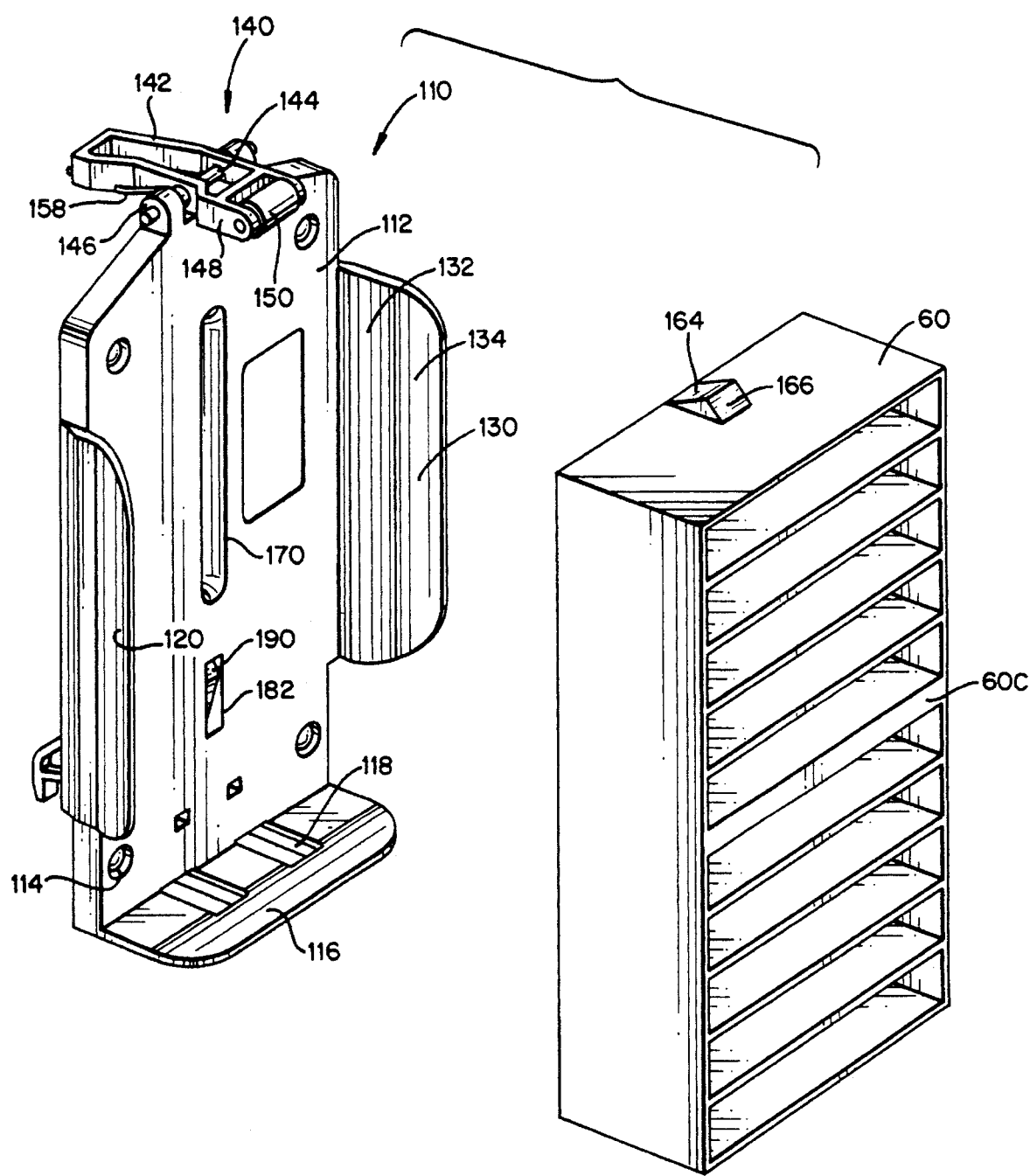
FIG. 5 is a front isometric view of the cartridge storage tray and tray mount of FIG. 4.
Figure 6:
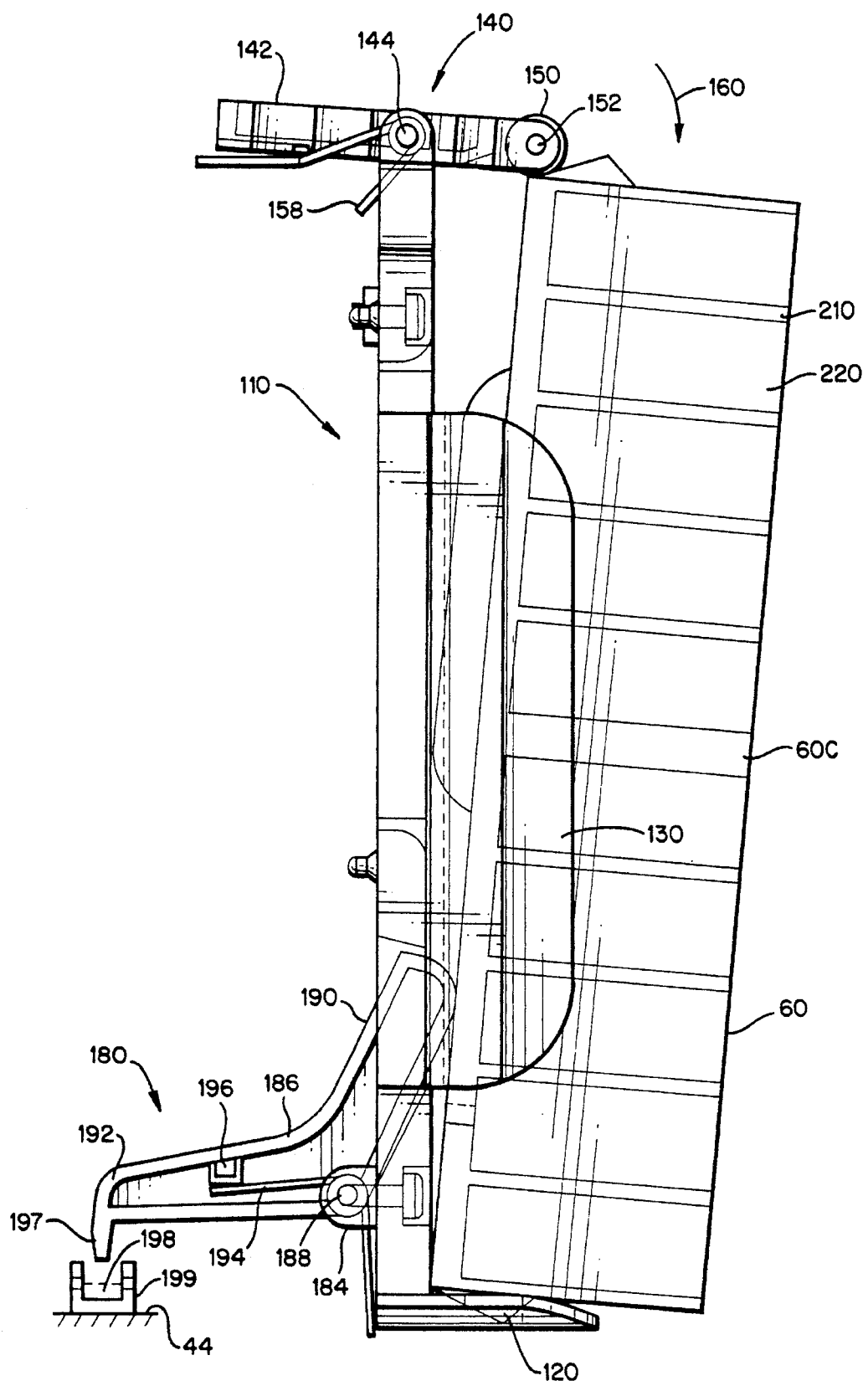
FIG. 6 is a side view, partially sectioned, of the cartridge storage tray and tray mount of FIG. 4 in a tray removal orientation.

As explained above, hub 34 has eight planar peripheral faces which serve as rack-accommodating surfaces. Each hub peripheral face has selectively mountable thereon a rack holder plate or rack mount 110. As shown in FIGS. 4–6, each rack mount 110 comprises an essentially planar base plate 112. Base plate 112 has a plurality of fastener apertures 114 useful for orienting base plate 112 and for receiving fasteners (e.g., bolts) for selectively securing rack holder plate 110 to its corresponding hub peripheral face. Along the bottom of base plate 112 at its minor dimension is provided a rack support shelf 116 which extends orthogonally from base plate 112. Rack support shelf 116 has a pair of grooved channels 118 for accommodating corresponding feet-like ramps 120 provided on rack 60.

At opposing edges along its major dimension, base plate 112 has a pair of rack stabilization and guide flanges 130 extending outwardly therefrom for guiding rack 60 into base plate 112 and maintaining rack 60 therein. Stabilization flanges 130 each have a first segment 132 which attached to base plate 122 and extending essentially perpendicularly from the plane of base plate 112, and a second segment attached to first segment 132. Second segment flairs outwardly away from the center of base plate 122 (see FIG. 5).

At its top base plate 112 has a rack engagement mechanism 140 mounted thereon. Rack engagement mechanism 140 includes a resiliently biased rocker arm 142 which is pivotally mounted about pivot pin 144. Pivot pin 144 has its ends rotatably captured between brackets 146 integrally formed on base plate 112. On a rack-oriented end thereof, rocker arm 142 has two projections 148 between which a rack-engagement roller 150 is rotatably carried on a pivot pin 152. Rocker arm 142 is biased by a torsion spring 158 in a clockwise direction about pivot pin 144 (e.g., in the direction shown by arrow 160 in FIG. 6). Rocker arm 142 is positioned so that, when a rack 60 is inserted into rack mount 110, scalene triangularly-shaped crown ramp 164 on rack 60 exerts a force on roller 150 to overcome the bias of spring 158, thereby pivoting roller 150 in a counterclockwise direction about pivot pin 144. As insertion of the rack 60 continues, roller 150 ultimately reaches the crest of crown ramp 164 and then rides down ramp face 166, at which point the biasing of roller 150 keeps rack 60 securely against rack mount 110.

As shown in FIG. 5, rack mount 110 has an elongated rack orientation slot 170 formed in its base plate 112. Orientation slot 170 is lies along a center axis of the minor dimension of base plate 112, but is off-center with respect to its major dimension. Orientation slot 170 is positioned so that an orientation fin 172 provided on an underside of rack 60 can insertably mate in slot 170.

As indicated above, not all peripheral faces of hub 34 in library 30 need necessarily have cartridge racks mounted thereon at any given time. Accordingly, as an optional feature, each rack mount rack mount 110 can have a rack presence sensor 180 illustrated in FIGS. 4, 6, and 7.

In this regard, rack mount base plate 112 has a sensor slot 182 lying along a center axis of the minor dimension of base plate 112, but off-center with respect to its major dimension, e.g., below orientation slot 170 (see FIG. 5). On its backside, base plate 112 has two brackets 184 integrally formed thereon.

Rack presence sensor 180 comprises a rack feeler member 186 pivotally mounted about a pivot pin 188. Pivot pin 188 is rotatably captured between brackets 184 on the rear of base plate 112. Rack feeler member 186 has a first end segment 190 and a second end segment 192. Feeler first end segment 190 and feeler second end segment 192 are oriented in a wide "V" shape, from pivot pin 188 it being seen that segments 190 and 192 are angularly separated by an obtuse interior angle. Feeler first end 190 has more of a vertical orientation, and is biased by spring 194 to extend through sensor slot 182 and beyond the plane of the front surface of base plate 112. In this regard, spring 194 has a first end which bears against the rear of base plate 112 and a second end which bears against an underside of a spring engagement block 196 formed on feeler second end 192. Feeler second end 192 has a detector trip toe 197 formed on a distal end thereof.

When a cartridge rack 60 is inserted into rack mount 110 in the manner described above, the underside of rack 60 bears against the portion of feeler first end 190 which protrudes through sensor slot 182 in base plate 110. Contact with feeler first end 190 in this manner causes feeler member 186 to overcome the biasing exerted by spring 194, and to pivot about pin 188 in a counterclockwise direction. When the cartridge rack 60 is fully installed in rack mount 110, and when hub 34 is rotationally positioned so that detector trip toe 197 interrupts an optical beam 198 of a detector 199 mounted on frame upper support surface 44 (see FIG. 7), detector 199 generates a signal by which an electronic controller of library 30 realizes that a cartridge rack has been installed on this hub face.

Figure 7:
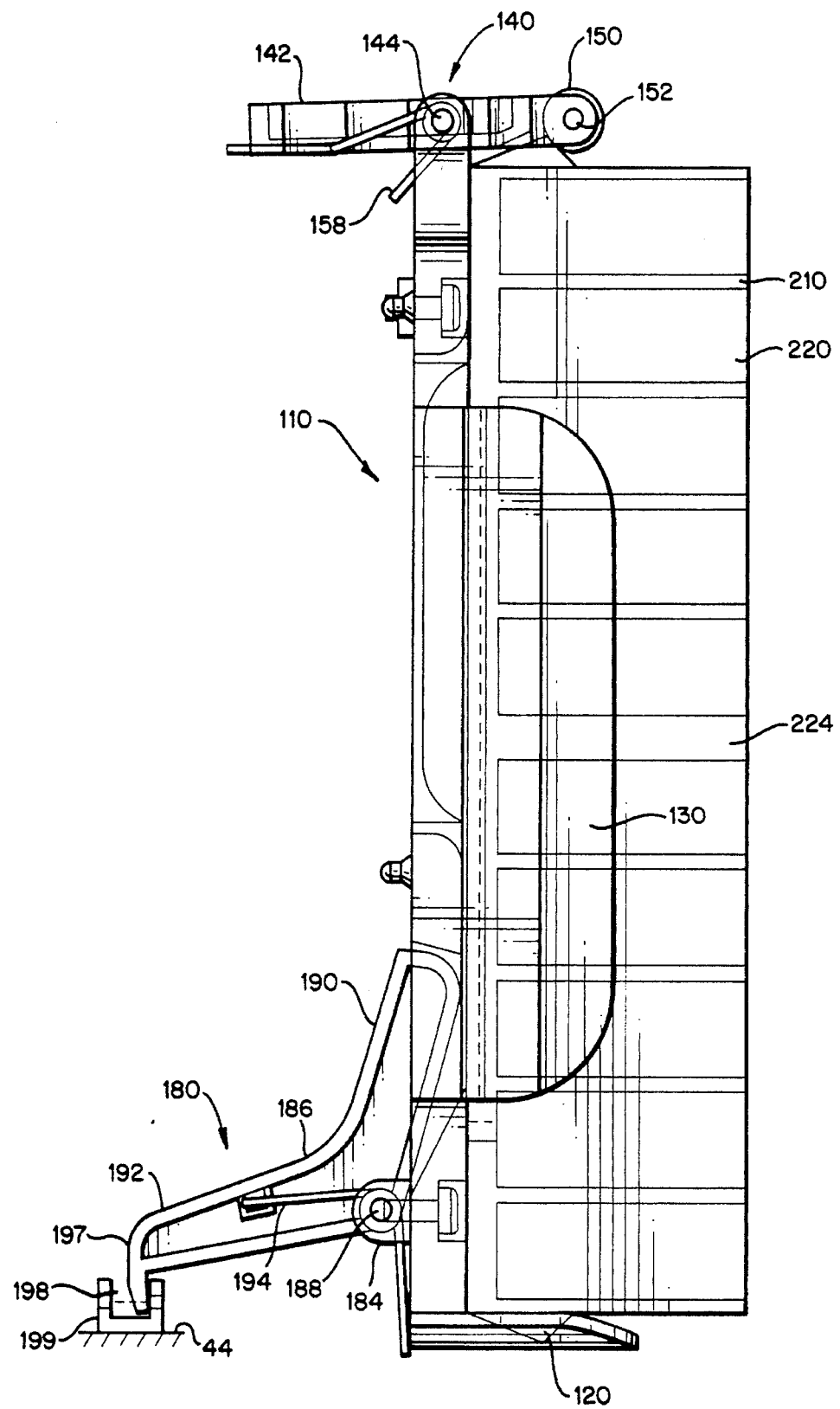
FIG. 7 is a side view, partially sectioned, of the cartridge storage tray and tray mount of FIG. 4 in a tray installation orientation.

FIGS. 6 and 7, as well as FIGS. 1 and 3, show that the cartridge racks 60 have a plurality of rack ribs 210 for dividing rack 60 into a plurality of cartridge-receiving slots 220. Among the ribs 210 is a central rib 224. Rib 224 is centrally positioned so that five cartridge slots are provided on opposite sides of the rib. Other features of the cartridge rack 60 are discernable from the foregoing discussion of its mounting to rack mount 110.

STRUCTURE: DRIVE MOUNTING

Figure 8:
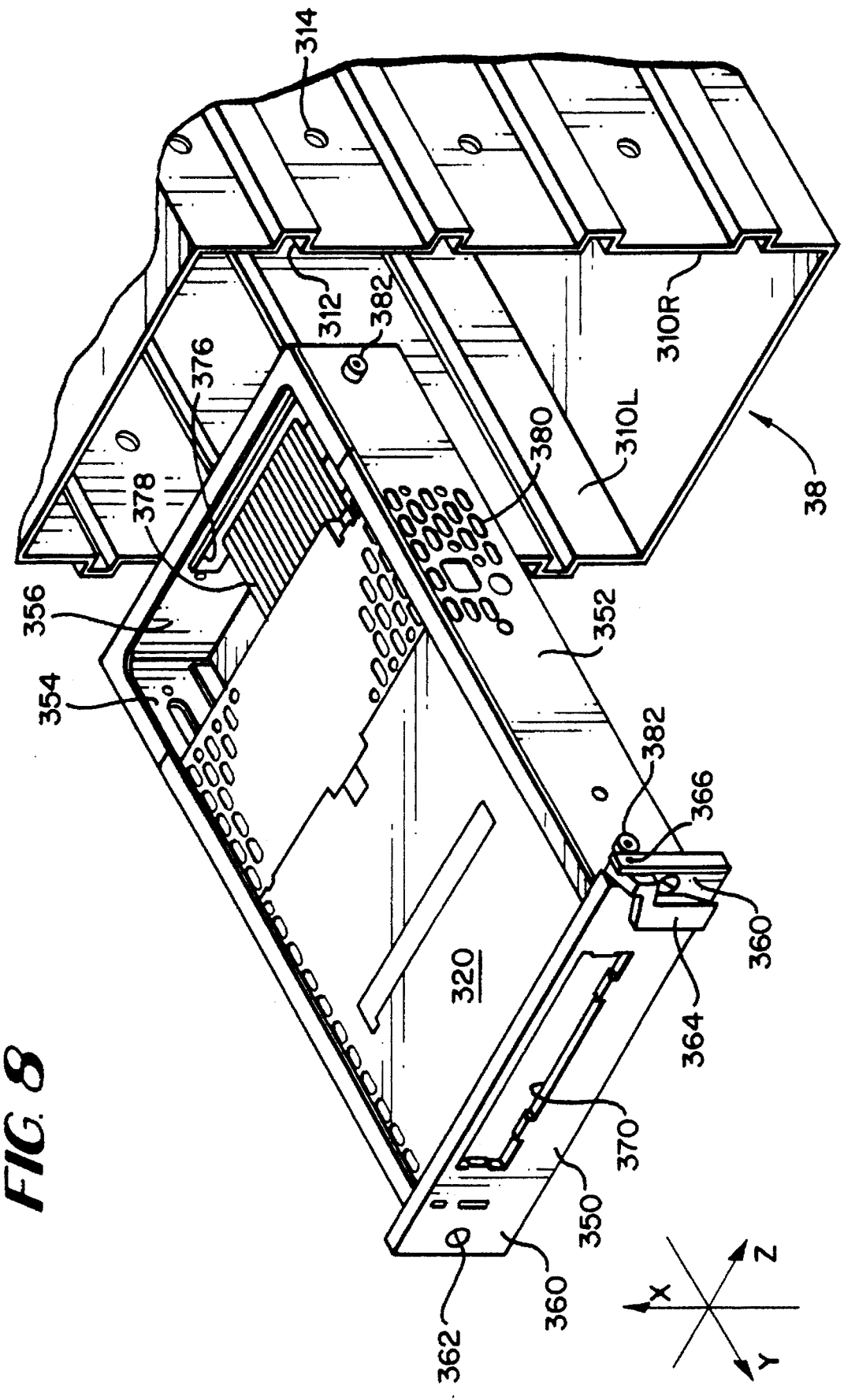
FIG. 8 is a front isometric view of a drive mount rack utilized in the library of FIG. 1, including a drive mounted therein.

FIG. 8 shows drive drawer rack portion 38 of library frame 32 in more detail. Drawer rack 38 includes two vertical walls 310R and 310L formed in a casting constituting library frame 32. Each wall 310R, 310L has four slots or drawer alignment channels 312 formed therein to extend in the Z direction as shown in FIG. 8 and spaced apart in the manner described below for accommodating the drawers 64. On its front surface (e.g., a surface in the XY plane), drawer rack 38 has fastener receiving apertures 314 provided thereon, two apertures 314 for each drive.

As mentioned above, drive drawer rack houses four drive drawers 64A–64D. Each drawer modularly encloses an I/O drive 320, such as a helical scan tape drive. The I/O drives are depicted schematically as elements 320A–320D in FIGS. 25A and 25B. One example of such a drive is EXB-8505 manufactured by Exabyte Corporation, which (among other things) performs data input and output operations with respect to magnetic tape media.

Figure 9:
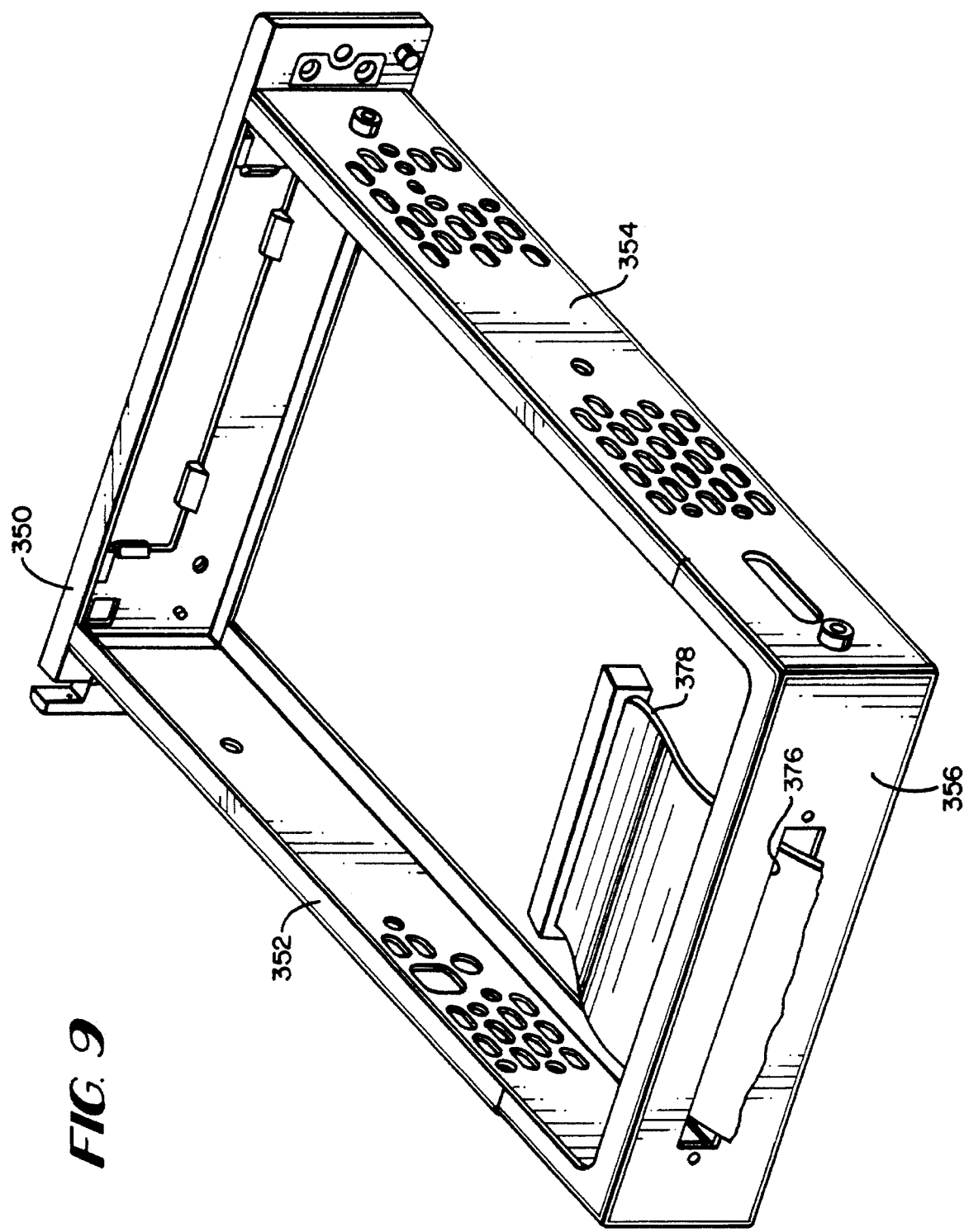
FIG. 9 is a rear isometric view of the drive mount rack of FIG. 8, but not having a drive mounted therein.

A drawer 64 is illustrated in FIGS. 8 and 9 as being generally of rectangular shape and including a drawer front wall 350; a drawer right side wall 352; a drawer left wall 354; and, a drawer rear wall 356. At their bottoms, each of the walls have a ledge formed thereon, thereby collectively providing a support ledge 358 for supporting the I/O drive 320.

Drawer front wall 350 has a greater extent across the width of drawer 64 than other portions of drawer 64. In particular, drawer front wall 350 has laterally protruding edges 360. Each edge 360 has a fastener-receiving aperture 362 formed therein. As understood with reference to FIG. 8 and the drive drawer rack illustrated therein, unillustrated fasteners extend through apertures 362 and into apertures 314 in rack 38 for securing drawer 64 to the drive drawer rack 38.

At its upper right hand corner as seen in FIG. 8, drawer front wall 350 has an ejection lever 364 pivotally mounted about pivot pin 366. Lifting a distal end of ejection lever 364 upwardly causes lever 364 to pivot about pin 366, thereby wedging a proximal end of lever 364 between the back surface of front wall 350 and the front wall of rack 38, which serves to partially eject drawer 64 from drive drawer rack 38.

Drawer front wall 350 also has a cartridge entry slot 370 extending therethrough, thereby permitting selective insertion and removal of cartridges from the drive 320 housed in drawer 64. Slot 370 of drawer 64 is aligned with a comparable cartridge-receiving slot in its corresponding drive 320.

Drawer rear wall 356 has a connector slot 376 extending therethrough. Slot 376 permits passage of a ribbon cable connector 378 by which electronics of the drive 320 are connected to a circuit board housed in electronics cage 90 (see FIG. 3 and FIGS. 25A and 25B).

Drawer side walls 352 and 354 have a plurality of ventilation apertures 380. Apertures 380 serve to allow air to circulate around the drive 320 housed in drawer 64. In addition, each drawer side wall 352 and 354 have a pair of alignment pins 382 provided thereon for slidable insertion into channels 312 formed in drive drawer rack 38.

Drawer rack mount 38 and drawers 64 modularly installed therein facilitate efficient installation and removal, as well as interchange, of I/O drives 320. A drive drawer 64 can easily be removed from drawer rack mount 38 by unfastening the drawer fasteners, pivoting the drawer ejection lever 364, and, sliding the drawer out of its slots 312. Installation involves converse operations.

STRUCTURE: PICKER MECHANISM

Figure 18:
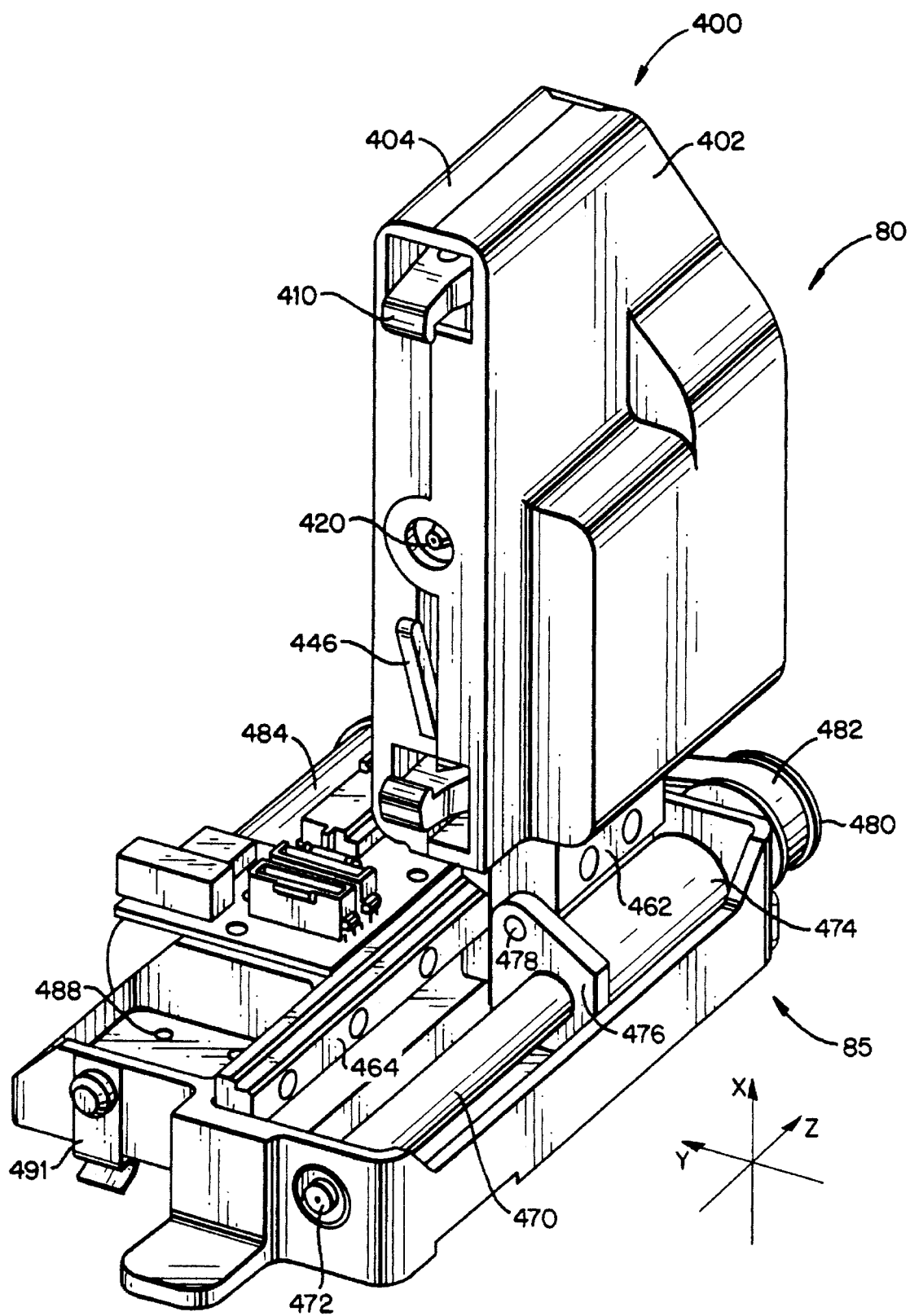
FIG. 18 is a rear, left side isometric view of a picker and picker transfer base of the library of FIG. 1.

FIG. 18 is a rear, left side isometric view of picker 80 and picker transfer base 85. As shown in FIG. 18, as well as FIG. 19, Picker 80 has a two-part picker frame 400, including picker frame half shell base 402 and picker frame half shell cover 404. As will be seen below, essentially all mechanical and electrical picker elements are mounted on frame half shell base 402. Frame half shell cover 404 mates with frame half shell base 402 to substantially enclose the constituent elements of picker 80.

Figure 20:
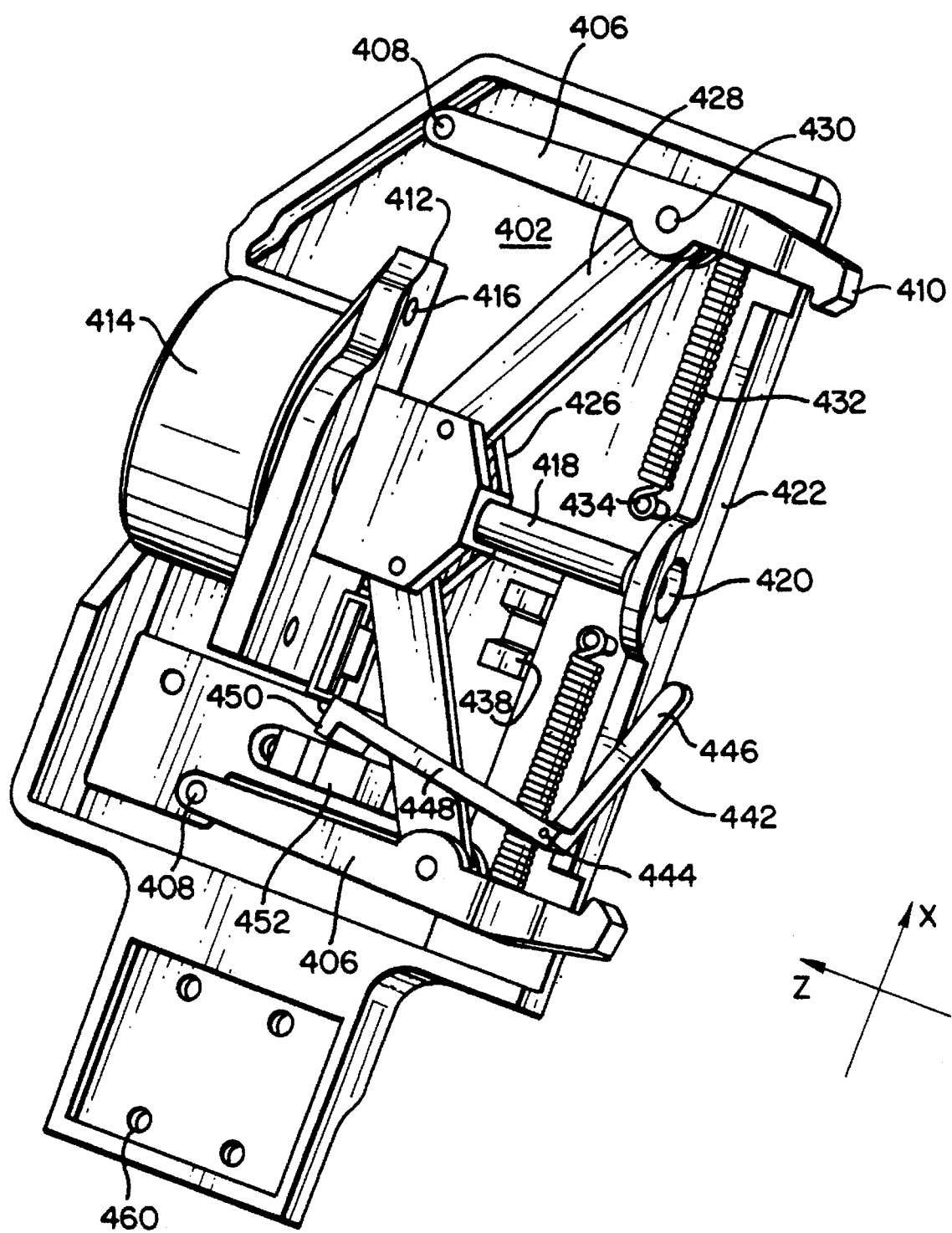
FIG. 20 is a rear, right side isometric view of the picker of FIG. 18 with a half housing cover removed.

As shown in more detail in FIG. 20, picker 80 includes a pair of gripper fingers 406 pivotally mounted to the picker half shell base 402. In particular, a mounting end of each gripper finger 406 is pivotally attached to pivot mounting pin 408 anchored in picker half shell base 402. Opposite or second ends of each gripper finger 406 has a projection 410 provided thereon configured to engage a changer grip notch of a data storage cartridge.

Frame half shell base 402 of picker 80 has a drive mounting flange 412 extending orthogonally therefrom. On one side of mounting flange 412 a stepper motor 414 is mounted by fasteners 416. Stepper motor 414 is provided with an integral leadscrew 418. Mounting flange 412 has an aperture formed therein so that leadscrew 418 can extend therethrough. At its end remote from motor 414, leadscrew 418 is retained in a leadscrew bearing 420, which in turn is mounted on a rear panel 422 of half shell base 402.

Picker 80 further includes a travelling carriage member, also known as leadscrew nut 426, which is counterthreaded to travel along a displacement path defined by leadscrew 418. Nut 426 is internally slotted to pivotally retain therein first ends of linkage elements 428. A second end of each linkage element 428 is pivotally connected at 430 to an intermediate segment of a corresponding one of the gripper fingers 406.

Between projections 410 and linkage attachment point 430, each gripper finger 406 has a first end of a biasing spring 432 connected thereto. A second end of biasing spring 432 is anchored at anchoring point 434 to frame half shell base 402. Springs 432 thus exert a biasing force on gripper fingers 406 to urge fingers 406 toward the axis of leadscrew 418.

Figure 24:
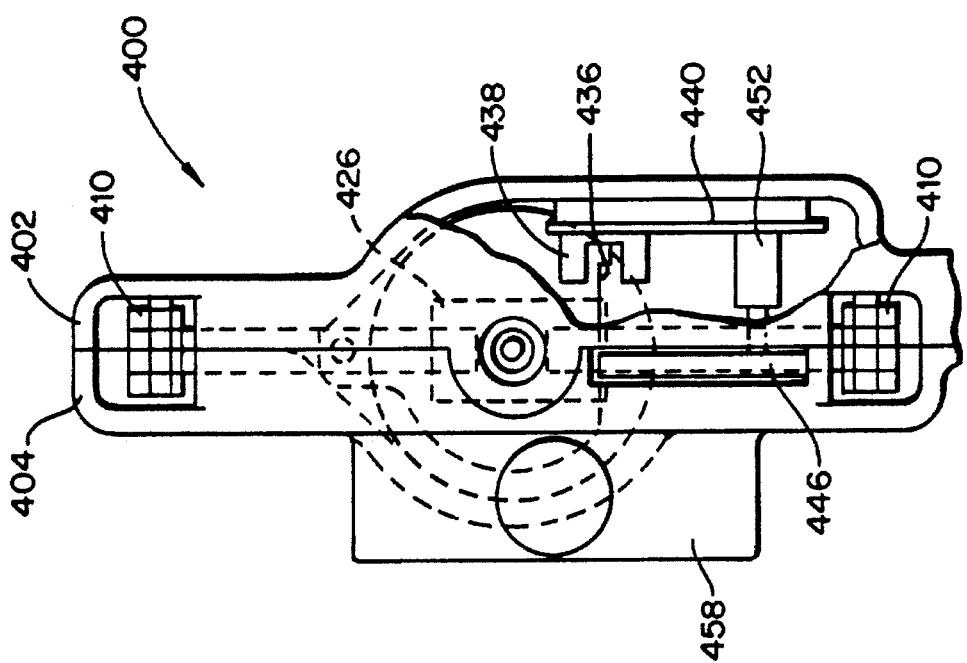
FIG. 24 is a rear view, partially cut-away, of the picker of FIG. 18.

As shown in FIG. 24, leadscrew nut 426 has a sensor trip 436 element mounted thereon. Sensor trip element 436 is a cantilevered element which extends toward frame half shell base 402. Sensor trip element 436 is of sufficient length to interrupt an optical beam of a finger open sensor 438. As shown in FIG. 20 in conjunction with FIG. 24, finger open sensor 438 is mounted on a circuit board 440 which, in turn, is mounted on frame half shell base 402.

Frame half shell base 402 also has a cartridge presence sense lever 442 pivotally mounted thereon at point 444. Cartridge presence sense lever 442 includes a cartridge feeler leg or feeler lever 446 and an orthogonally shaped notch provided therein through which cartridge feeler leg 446 protrudes for contact with a cartridge engaged between fingers 406. When a cartridge is engaged between fingers 406, cartridge sense lever 442 is pivoted in a counterclockwise direction (as seen in FIG. 20) about point 444) so that a spur 450 on sensor trip leg 448 interrupts an optical beam of cartridge presence sensor 452 (see FIG. 20). Like gripper open sensor 438, cartridge presence sensor 452 is mounted on circuit board 440.

Figure 19:
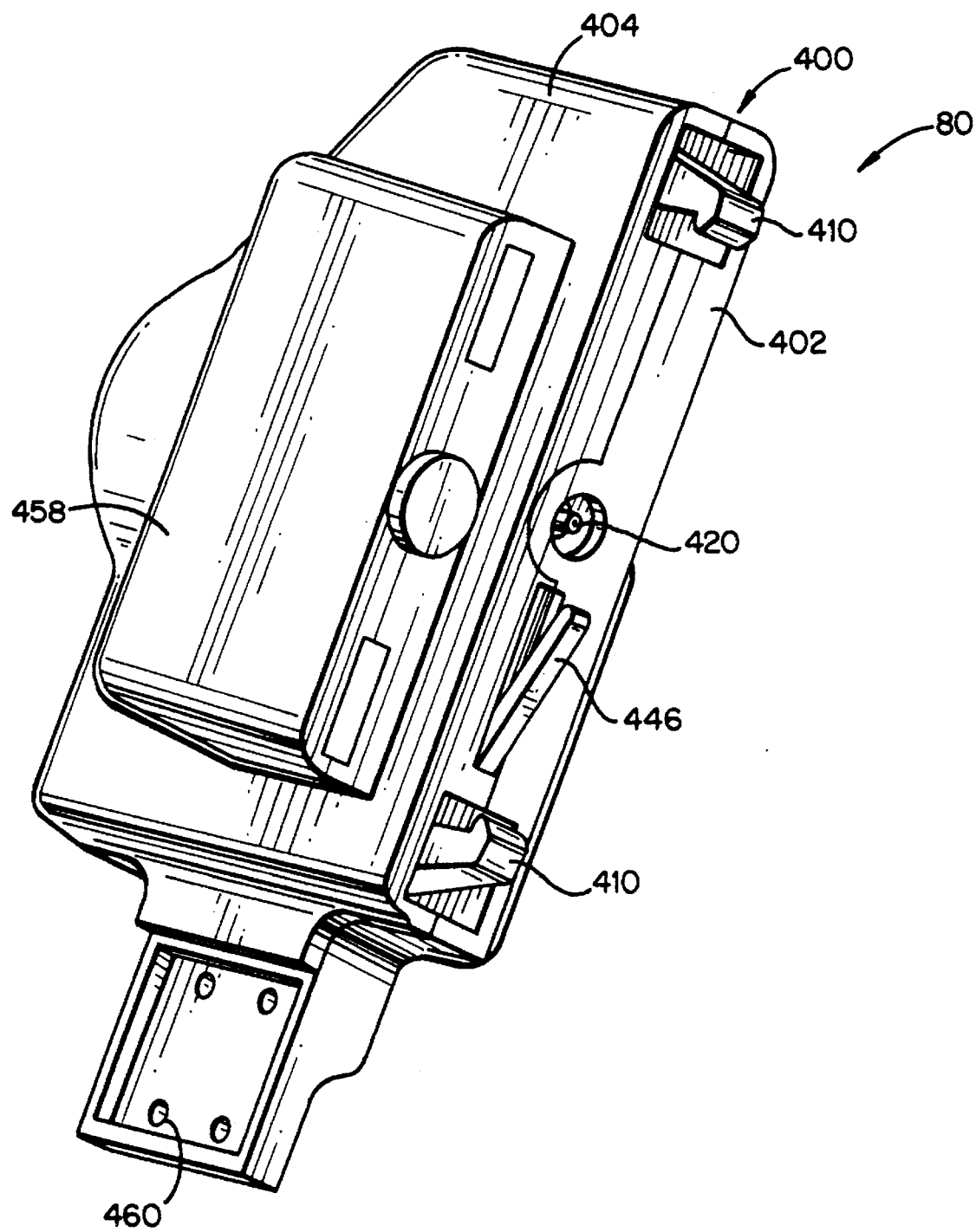
FIG. 19 is a rear, right side isometric view of the picker of FIG. 18 together with a barcode reader mounted thereon.

As shown in FIG. 19, picker frame 400, and particularly picker frame half shell cover 404, can have a barcode reader 458 mounted thereon. Barcode reader 458 is useful for reading barcodes or similar indicia provided on labels borne by cartridges stored in library 30.

FIGS. 19 and 20 also show that the bottom of picker frame half shell base 402 is configured with four fastening apertures 460 for threaded connection to linear way block 462. As shown in FIG. 18, linear way block 462 slides along a short axis ("Z" axis) linear bearing 464 carried by picker transfer base 85.

Picker transfer base 85 also carries a picker Z direction leadscrew 470 between leadscrew bearings (bearing 472 being shown in FIG. 18). Leadscrew 470 has a leadscrew nut 474 counterthreadedly carried thereon for translation along the Z direction. Linear way block 462 is mounted on nut 474 by nut carriage block 476 (to which linear way block 462 is attached by fasteners 478). At its front end leadscrew 470 carries a pulley 480. A drive belt 482 is entrained about pulley 480 and a drive shaft (hidden in FIG. 18) of a Z-direction motor 484. Z-direction motor 484 has an associated Z-axis encoder 486 (see FIGS. 25A and 25B).

On its underside, picker transfer base 85 slidably mounts on an X direction linear bearing forming part of the linear bearing assembly 86 illustrated in FIG. 1. In particular, fasteners 488 hold a bearing block 490 (schematically illustrated in FIGS. 21–23) on the underside of picker transfer base 85. As shown in FIG. 18, picker transfer base 85 also carries a spring clip 491 which clips bearing block 490 to base 85 to ensure proper alignment and mating.

Bearing block 490 engages X-direction linear bearing 492, thereby permitting picker transfer base 85, and picker 80 carried thereby, to move in the X direction as shown in FIG. 1. Movement in the X direction is accomplished by an unillustrated X-direction stepper motor, which as an associated X-direction encoder 493 (see FIG. 25A and 25B).

FIGS. 21, 22, and 23 show gripper fingers 406 of picker 80 in three positions relative to changer notches 494 of a cartridge 496. FIG. 21 shows an cartridge insert or cartridge "shove" position; FIG. 22 shows a cartridge grip position; FIG. 23 shows a gripper open position. The positioning of leadscrew nut 426 along the displacement path defined by leadscrew 418 determines the position of the gripper fingers 406 relative to the cartridge 496. Thus, actuation of stepper motor 414 can be controlled so that the gripper fingers 406 are in a desired position.

For example, when picker 80 is travelling in the negative Z direction to approach a cartridge 496 (whether the cartridge is in a drive 320, a rack, or in entry/exit transfer device 500), the stepper motor 414 is actuated so that nut 426 travels its farthest extent to the gripper open position shown in FIG. 23. Library 30 is advised that fingers 406 are open as sensor trip 436 interrupts an optical beam of finger open sensor 438 (see FIG. 24). When picker 80 has approached sufficiently closely to cartridge 496 that an indicia-bearing edge 498 of the cartridge causes feeler leg 446 of cartridge presence sensor 442 to rotate to such a degree that spur 450 interrupts the optical beam of sensor 452, library 30 knows that picker 80 is ready to engage cartridge 496. At this point, stepper motor 414 is reversed and nut 426 is translated to the grip cartridge position shown in FIG. 22.

In the grip cartridge position of FIG. 22, gripper fingers 406 pivot about pins 430 so that projections 410 engage cartridge changer notches 410. As shown in FIG. 22, in the cartridge grip position linkages 406 disengage gripper fingers 406, so that fingers 406 hold cartridge 496 by the force of springs 432.

After cartridge 496 is engaged, picker 80 is then translated in the Z direction by operation of DC motor 484 and leadscrew 470 (see FIG. 18). Picker 80, and consequently cartridge 496 engaged thereby, can then be transported in the X direction to a target position. As indicated above, the target position can be a drive 320 in one of the drive drawers 64, one of the slots in active rack 60, or entry/exit cartridge handling section 506. Release of cartridge 496 from picker 80 is understood as involving steps converse to those described above.

In addition, it should be noted that, once a cartridge is at least partially inserted into its destination or target device or rack slot, picker 80 can be backed up (e.g., moved in the Z direction) and stepper motor 414 actuated so that nut 426 is translated to its leftmost extreme in FIG. 21, thereby placing gripper fingers 406 in a cartridge shove position. In the cartridge shove position, projections 410 on gripper fingers 406 are separated by a distance in the X direction which is less than the length of the indicia-bearing face 498 (i.e., engagement dimension) of cartridge 496. As picker 80 is again translated in the negative Z direction toward cartridge 496, projections 410 contact indicia-bearing edge 498 of cartridge 496 and push or shove cartridge 496 further into the target rack 60 or drive 320.

STRUCTURE: ENTRY/EXIT PORT

As indicated above, housing front panel 94 of library 30 has an entry/exit port 100 through which cartridges can be inserted and removed from library 30. To transport cartridges to and from entry/exit port 100 relative to the active area of library 30, an entry/exit transport device 500 is provided. Entry/exit transport device 500 is illustrated in several drawings, including FIGS. 10–15.

Entry/exit transport device 500 includes an entry/exit base section 502; an entry/exit rotating carriage section 504; and, an entry/exit cartridge handling section 506. As will be seen below, in a cartridge loading mode, a cartridge is manually inserted into cartridge handling section 506 through entry/exit port 100. To facilitate cartridge insertion, carriage section 504 is extended toward entry/exit port 100 from its nominal position and, subsequent to insertion, is retracted and rotated (about a vertical axis) to an active area of library 30. A cartridge removal mode is essentially the converse of the foregoing summarized loading mode. Each section of entry/exit transport device 500 is separately described below, with reference particularly to FIG. 13.

Figure 13:
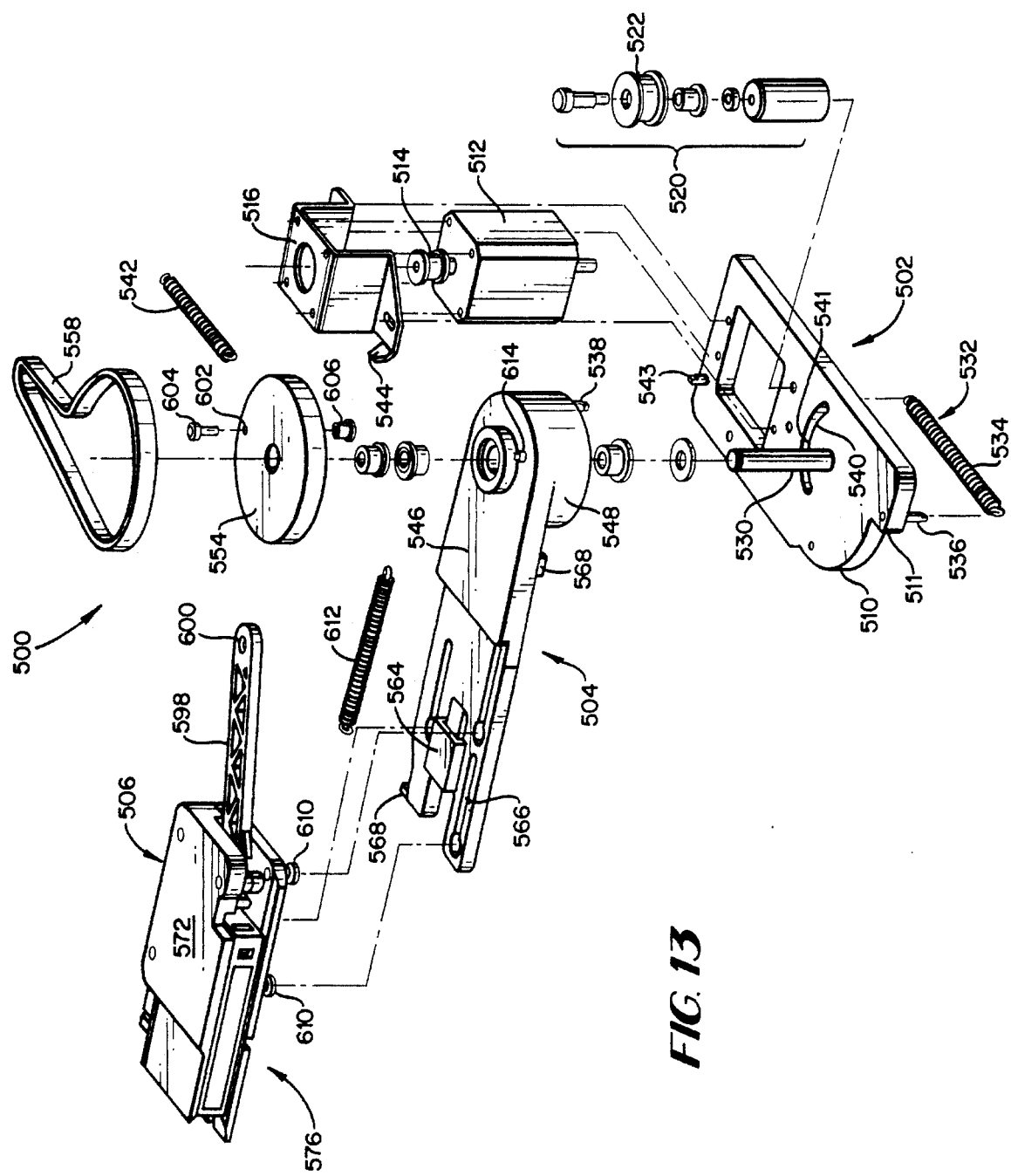
FIG. 13 is an exploded view of a cartridge transport device utilized in the library of FIG. 1.
Figure 14:
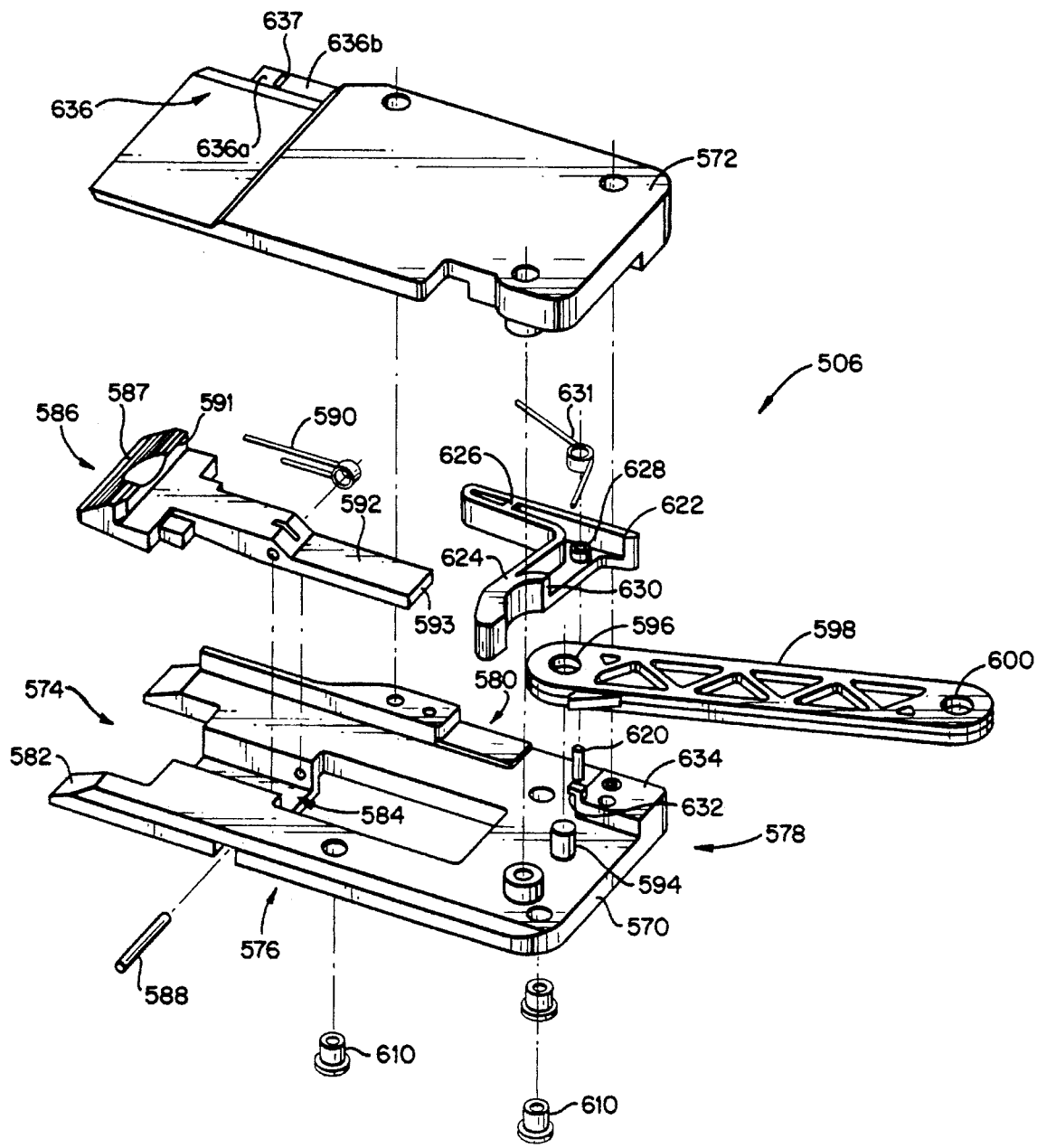
FIG. 14 is an exploded view of a cartridge handling device utilized in the library of FIG. 1 and included in the cartridge transport device.

Entry/exit base section 502 includes a base plate 510 which is mounted to library frame upper support surface 44 (see FIGS. 1 and 13). At its distal end remote from its point of attachment to surface 44, base plate 510 is configured to provide a rotational stop 511.

Base plate 510 has a rectangular aperture formed therein for accommodating entry/exit stepper motor 512. Stepper motor 512 has a drive shaft extending therefrom, to which motor belt pulley 514 is attached. Motor bracket 516 is mounted over stepper motor 512 and anchored (by fasteners) to base plate 510 for holding motor 512 in position. Motor belt pulley 514 extends through an aperture provided in the top of motor bracket 516.

Entry/exit base section 502 also has a guide roller assembly 520 mounted thereon. Guide roller assembly 520 is surmounted by guide roller 522.

Entry/exit base section 502 has further features discussed in more detail hereinafter, including a vertical carriage mounting shaft 530 (see FIG. 13) and carriage biasing assembly 532. Carriage biasing assembly 532 includes a spring 534 which has a first end connected to bracket 536 fastened to the underside of plate 510. A second end of spring 534 is connected to a bracket 538 which extends through an arcuate aperture 540 formed in plate 510 (see FIG. 13). Arcuate aperture 540 has a center point 541 which, as explained below, serves to change biasing directions of spring 534.

Entry/exit base section 502 also includes a belt tensioning spring 542. A first end of belt tensioning spring 542 is engaged by a hook 543 provided on base plate 510; a second end of belt tensioning spring 542 is engaged by a hook on angled flange 544 of motor bracket 516.

Figure 10:
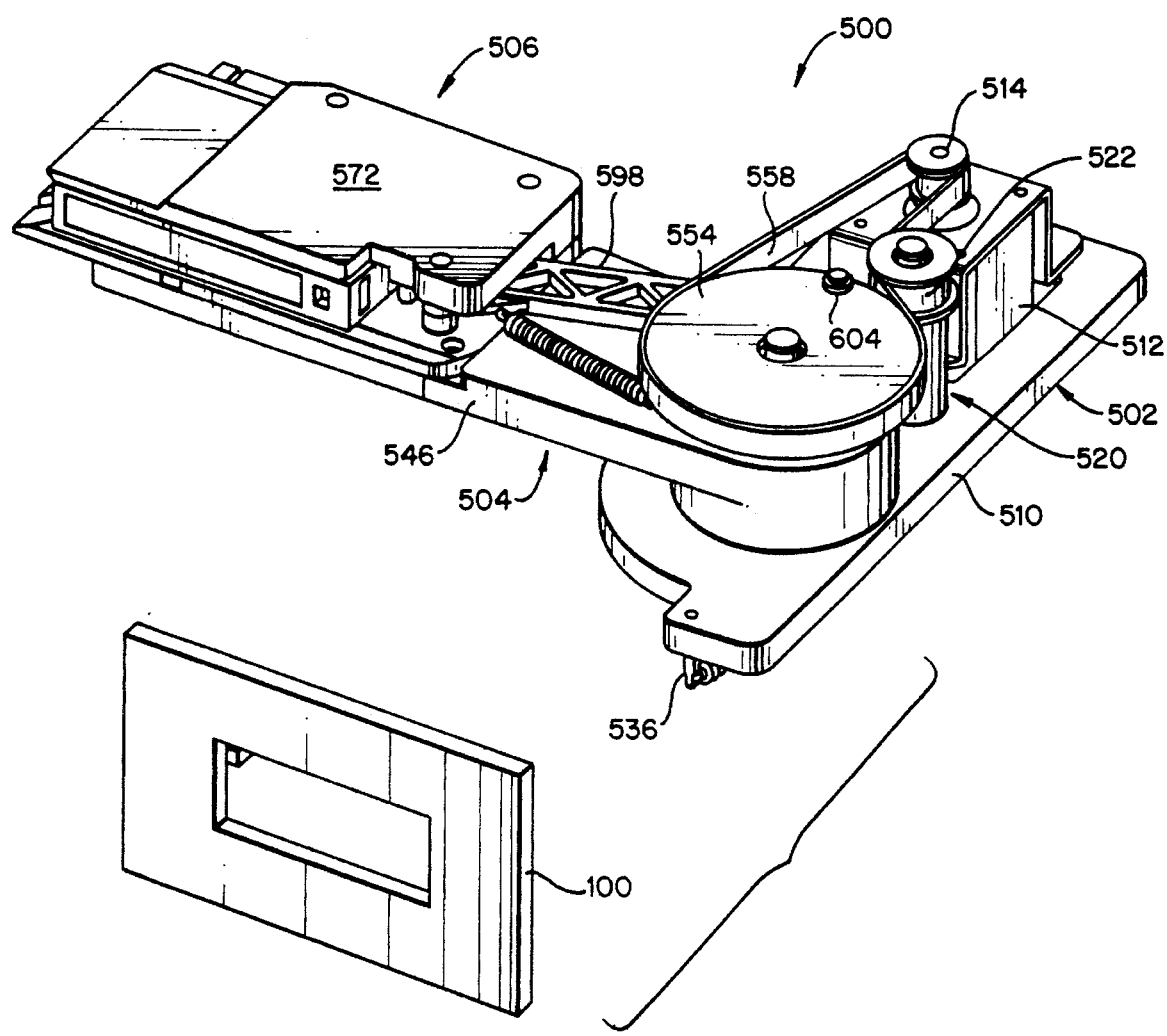
FIG. 10 is front isometric view of a cartridge transport device utilized in the library of FIG. 1. in a home position.
Figure 11:
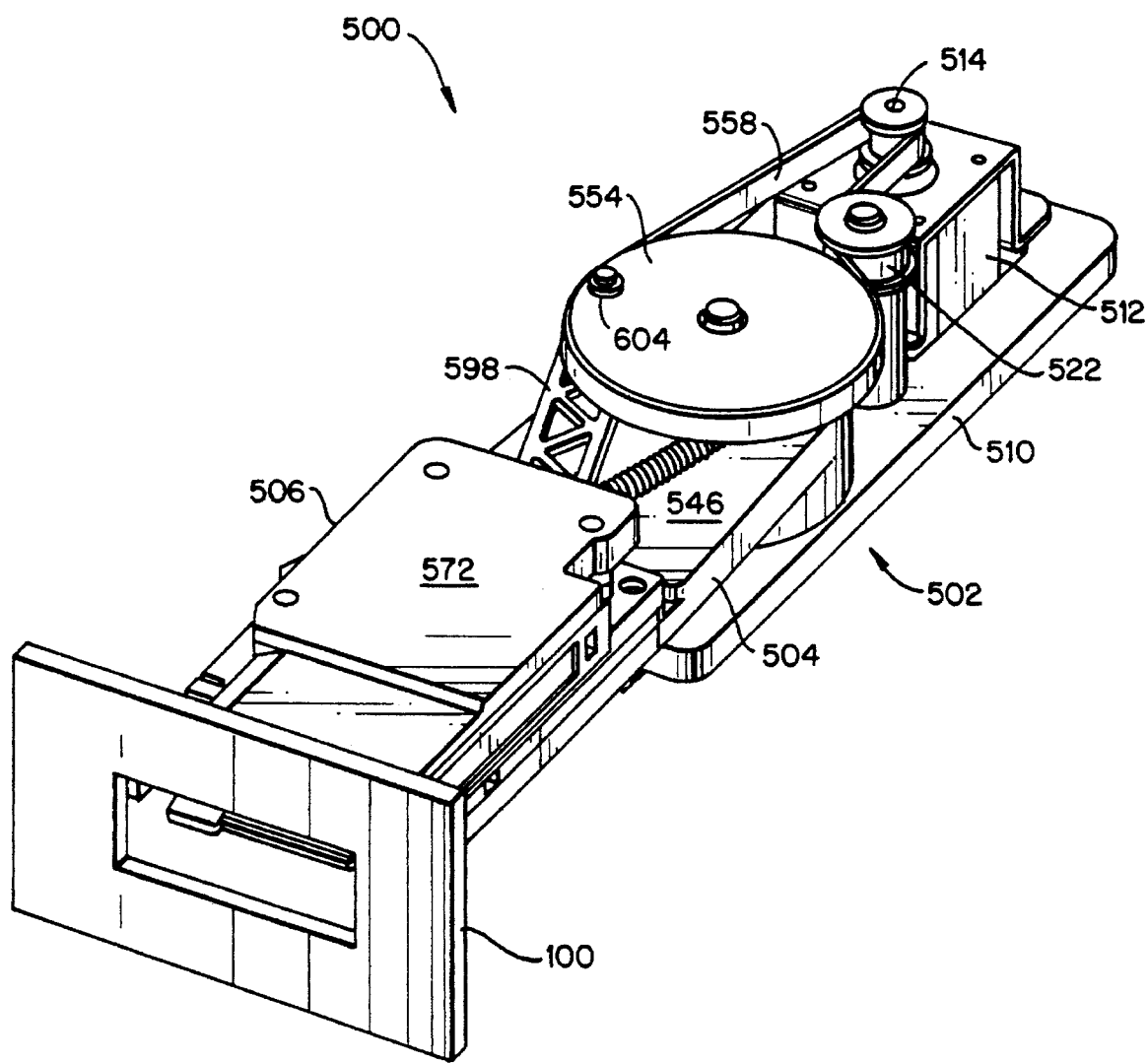
FIG. 11 is front isometric view of a cartridge transport device utilized in the library of FIG. 1. in a rotated position.
Figure 12:
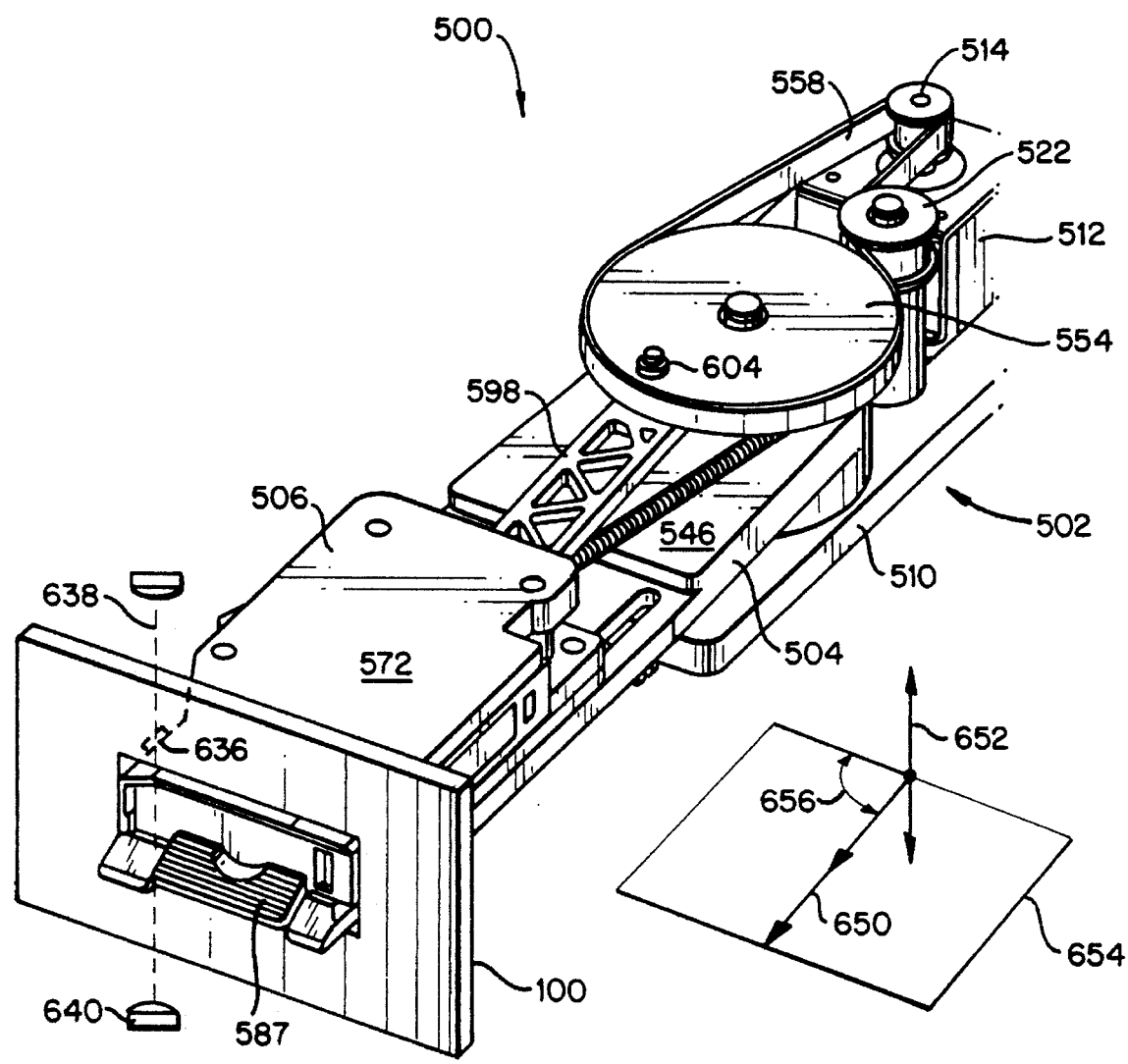
FIG. 12 is front isometric view of a cartridge transport device utilized in the library of FIG. 1. in an extended position.

Entry/exit carriage section 504 includes an elongated carriage arm plate 546. At a first end thereof, carriage arm plate 546 has a circular shoulder member 548 formed on an underside thereof. Shoulder member 548 has a central aperture for receiving carriage mounting shaft 530 as well as bushings and bearings which fit over shaft 530. Shaft 530 extends through the upperside of the first end of carriage arm plate 546, and has circular gear 554 rotationally mounted thereon. Gear 554 is mounted to carriage arm plate 546 whereby gear 554 and arm plate 546 rotate about shaft 530 in unison. In this regard, driving belt 558 (entrained about motor belt pulley 514, guide roller 522, and gear 554)

imparts the rotational motion of the shaft of stepper motor 512 to gear 554 for moving carriage section 504, and hence a cartridge engaged thereby, to a selected one of three positions—a home position (shown in FIG. 10; a rotated position (shown in FIG. 11; and, an extended position (shown in FIG. 12).

At its second end, the upperside of carriage arm plate 546 is recessed with respect to its first end. The recessed second end of carriage arm plate 546 has bridge 564 mounted thereon. Recessed second end of carriage arm plate 546 also has a plurality of elongated guide tracks 566 extending therethrough and running parallel to a major axis of plate 546.

On its underside, carriage arm plate 546 has a projection 568 provided thereon. Projection 568 is positioned so that when entry/exit transport device 500 is in a fully rotated position as hereinafter discussed, projection 568 is stopped by rotational stop 511.

At an extremity of its second end, carriage arm plate 546 has an orthogonally extending sensor trip projection 567 formed thereon. As shown in FIG. 17, trip projection 567 interrupts an optical beam 568 of a entry/exit home sensor 569 when entry/exit transport device is in a "home" position. Entry/exit home sensor 569 is mounted on frame upper support surface 44.

Entry/exit cartridge handling section 506 (seen in detail in FIG. 14) includes handling bottom plate 570 to which handling top plate 572 is secured by fasteners. Plates 570 and 572 are internally configured and spaced apart to accommodate a cartridge therebetween.

Cartridge handling section 506 has a portorientable edge 574; a picker-orientable edge 576; a carriage-facing edge 578; and, a back edge 580. Port-orientable edge 574 is open to enable passage of a cartridge to and from entry/exit port 100 (the direction of passage being parallel to the major dimension of the cartridge). Picker-orientable edge 576 is similarly open to enable passage of a cartridge contained therein to and from picker mechanism 80 (the direction of passage being parallel to the minor dimension of the cartridge).

At the port-orientable edge 574, bottom plate 570 has two spaced-apart and ramped projections 582. Near edge 574, bottom plate 570 has a recessed throat 584 which accommodates manual ejection lever 86. In particularly, manual ejection lever 586 is pivotally retained in throat 584 by pivot pin 588. On its port-oriented end, cartridge lever 586 has a ramp 587 which is stepped in gradations, but which falls to form a cartridge trap wall 591. A torsion spring 590 biases the port-oriented end of cartridge lever 586 upwardly. When a cartridge is properly seated in handling section 506, a throat-contained end 592 of lever 586 lies sufficiently low in throat 584 so that end 593 thereof does not abut bridge 564.

Near its carriage-facing edge 578 the handling bottom plate 570 has a vertical pin 594 mounted thereon. Pin 594 extends through an aperture 596 formed at a first end of an elongated linkage bar 598. A second end of linkage bar 598 has a similar aperture 600 which is positioned under gear 554. In particular, near its periphery gear 554 has a gear hole 602. Fastener 604 and bushing 606 extend through gear hole 602 and aperture 600 of linkage bar 598, so that the second end of linkage bar 598 can pivot with respect to the underside of gear 554 to which it is attached.

The underside surface of handling bottom plate 570 has a plurality of guide pins 610 depending therefrom. Guide pins 610 are so positioned, and their shafts sufficiently long, so that heads of guide pins 610 extend through corresponding guide tracks 566 in carriage arm plate 546 (see FIG. 13).

The underside surface of handling bottom plate 570 also has an unillustrated hook formed thereon for engaging a first end of spring 612. A second end of spring 612 is engaged by hook 614 formed on circular shoulder member 548 of carriage arm plate 546.

The upper surface of handling bottom plate 570 further has a cartridge ejection shaft 620 vertically mounted thereon. A cartridge ejection element 622 having two legs (e.g., cartridge contact leg 624 and biasing leg 626) has an aperture 628 (near the intersection of legs 622 and 624) which rotatably accommodates ejection shaft 620. A backside of cartridge contact leg 624 has a rearwardly projecting heel 630. Cartridge ejection element 622 is biased by torsion spring 631 toward throat 584. A first end of torsion spring 631 is housed in biasing leg 626, a second end of torsion spring 631 extends an opening on the back of cartridge contact leg 624 where it is engaged by hook 632.

Top plate 572 of entry/exit cartridge handling section 506 has a limit switch trip 636 formed on the back edge thereof. Limit switch trip 636 has two segments, particularly segments 636a and 636b which are separated by gap 637. As shown in FIG. 12, in approaching the extended position, limit switch trip segment 636a first interrupts a beam 638 of an entry/exit limit switch 640, after which beam 638 is interruputed by limit switch trip segment 636b. In normal operation, when a cartridge has been successfully received through entry/exit port 100 and as cartridge handling section 506 is being contracted in the Z direction, limit switch trip segment 636b first interrupts beam 638, producing a first pulse, after which limit switch trip segment 636a interrupts beam 638, thereby generating a second pulse. If the second of the two pulses is not generated within a predetermined time window after the first pulse, library 30 determines that an error has occurred in receiving the cartridge at the entry/exit port 100. Although not specifically shown as such in FIG. 12, entry/exit limit switch 640 is mounted on a rear face of housing front panel 94.

Thus, a cartridge received in cartridge handling section 506 has its major planar dimension lying in an entry/exit transport plane which is parallel to the unit orientation plane (e.g., horizontally). In moving between the home position shown in FIG. 10 and the rotated position shown in FIG. 11, the entry/exit transport device 500 rotates about shaft 530. Shaft 530 thus provides a vertical axis which is essentially perpendicular to the unit orientation plane). Entry/exit transport device 500 is extensible in a direction lying in a horizonal plane toward entry/exit port 100.

Rotation and extension of entry/exit transport device 500 is accomplished by stepper motor 512 acting (via driving belt 558) on gear 554. The rotation and extension of transport device 500 is understood with respect to the relative positionings of fastener 604 in FIGS. 10–12.

In particular, FIG. 10 transport device 500 in a home position and fastener 604 is at a 12 o'clock orientation. Transport device 500, and particularly leg 626 of ejection lever 622, is biased against stop 642 by spring 532, spring 532 being in the farthest clockwise position of arcuate aperture 540 as shown in FIG. 13. When stepper motor 512 is directed to move transport 500 to entry/exit port 100, the shaft of stepper motor 512 rotates, ultimately causing gear 554 to make a quarter turn rotation, and thereby bringing fastener 604 to the 9 o'clock orientation as shown in FIG. 11. As gear 554 makes this first quarter turn, spring 532 travels past the midpoint 541 of arcuate aperture 540, at which point spring 532 detents and, rather than biasing transport 500 to the home position, biases transport to the rotated position shown in FIG. 11. In this regard, the fact that spring 612 is stiffer than spring 532 causes transport device 500 to rotate prior to extending. When protrusion 568 abuts rotational stop 511 (see FIG. 13), fastener 604 is at the 9 o'clock position and the fully rotated position of FIG. 11 is realized.

Then, as the shaft of stepper motor 512 continues to rotate, gear 554 rotates a second quarter rotation so that fastener 604 assumes the 6 o'clock position shown in FIG. 12. In making the second quarter rotation, gear 554 (acting on linkage bar 598) pushes or extends cartridge handling section 506 away from gear 554 (e.g., in the direction shown by arrow 650 shown in FIG. 12). In approaching the extended position, limit switch trip segment 636a first interrupts beam 638 of an entry/exit limit switch 640, after which beam 638 is interruputed by limit switch trip segment 636b.

Thus, in FIG. 12, if axis 652 represents the vertical axis provided by shaft 530, and plane 654 represents the plane in which a cartridge engaged by transport 500 is transportable, angle 656 shows the angle of rotation in plane 654 through which the cartridge is rotatable. Angle 656 is 90 degrees.

When the entry/exit transport 500 is in the extended position shown in FIG. 12, ramp 587 of manual ejection lever 586 extends through entry/exit port 100. When a user pushes down on ramp 587, a cartridge contained between wall 591 and ejection lever 624 is expelled from cartridge handling section 506 by the biasing of ejection lever 624.

When a user desires to load a cartridge into entry/exit transport mechanism 500 through entry/exit port 100, the user depresses ramp 586 and inserts the cartridge into the interior of cartridge handling section 506, so that the cartridge is engaged between retaining wall 591 and leg 624. Then, steps substantially converse to the foregoing begin to be executed, with cartridge handling section 506 first being retracted along the Z direction. In particular, as handling section 506 is being retracted, limit switch trip segment 636b first interrupts beam 638, producing a first pulse, after which limit switch trip segment 636a interrupts beam 638, thereby generating a second pulse.

If, for some reason, the cartridge is not properly seated as above described, end 593 of lever 586 will abut bridge 564, which will preclude further retraction of handling section 506 along the Z direction. Further retraction will preclude generation of the second of the two pulses and, after expiration of the predetermined time window, library 30 will determine that an error has occurred in receiving the cartridge at the entry/exit port 100. Thus, library 30 provides an essentially completely mechanical detection of cartridge insertion failure (dislodged or jammed cartridge, or cartridge not fully inserted) in the entry/exit port transport 500.

As indicated above, the steps of moving entry/exit transport device 500, and consequentially a cartridge contained therein, from the entry/exit port 100 (the "extended" position of FIG. 12) to the "home" position of FIG. 10 are the reverse of those described above. In this regard, for loading a cartridge from entry/exit port 100 to the home position, stepper motor 512 is operated in a reverse direction from that described above. Moreover, the greater strength of spring 612 (compared to spring 532) and the detented position of spring 532 assures that retraction occurs prior to rotation.

STRUCTURE: ELECTRONICS

FIGS. 25A and 25B show connection of various electronic components comprising library 30. In particular, FIGS. 25A and 25B show components housed in electronics cage 90 (denoted by a broken line), as well as various sensors, motors, etc. already described.

Circuit boards included in electronics cage 90 include board 700 upon which a library main controller 701 is mounted; and, I/O board 704. A picker controller 702 is mounted on the circuit board 440 contained in picker frame 400 (see FIG. 24). A cable 710 connects the picker controller 702 to board 700. A cable 712 connects X axis motor encoder 493 to board 700. A cable 714 connects front panel interface card 98 with keypad to board 700. In addition, board 700 is connected by cables to drum or hub encoder 51; to drum home sensor 68; to entry/exit stepper motor 512; to entry/exit port home sensor 569; to entry/exit port limit sensor 640; and, (optionally) to rack presence sensor 180.

As shown in FIGS. 25A and 25B, board 700 also has a SCSI controller 730 mounted thereon. In addition, board 700 bears a servo controller 740. In the illustrated embodiment, servo controller chip bears National Semiconductor part number LM 629.

OPERATION: POSITION DETECTION

As is apparent from the foregoing, picker 80 is translated in the Z direction toward and away from (e.g., perpendicular to) plane VP (see FIG. 17) and in the X direction in a plane parallel to plane VP. Picker 80 can be translated to perform a number of operations, including the following: moving a cartridge from active rack 60 to a drive 320; moving a cartridge from a drive 320 to active rack 60; moving cleaning cartridge 70 into a drive 320; returning cleaning cartridge 70 from a drive 320 to its storage position; and, loading and unloading a cartridge from entry/exit transport 500.

In general, when picker 80 is to be directed to perform an operation such as one of the foregoing, library main controller 701 provides servo controller 740 (see FIGS. 25A and 25B) with library destination coordinates (X, Z) to which picker 80 is to be moved. Using conventional PID (Proportional, Integral, Derivative) formulae, servo controller 740 activates the unillustrated X direction motor and the Z-direction motor 484 as required to maneuver picker 80 the destination position. In this regard, using the PID algorithm, servo controller 740 at every instance tracks both an actual position for picker 80 and an ideal position for picker 80. A position error value is continuously computed by servo controller 740. The position error value is the difference between actual position and ideal position multiplied by a gain constant. The position error value, filtered through the PID formulae, is used to apply a motor current signal to the appropriate directional motor.

In normal operation, the momentary actual position is very near the momentary ideal position. However, in two circumstances the difference between the actual position and the ideal position may become significant. The present invention capitalizes upon such positional difference both for a malfunction determination and for an inventory operation.

Figure 26:
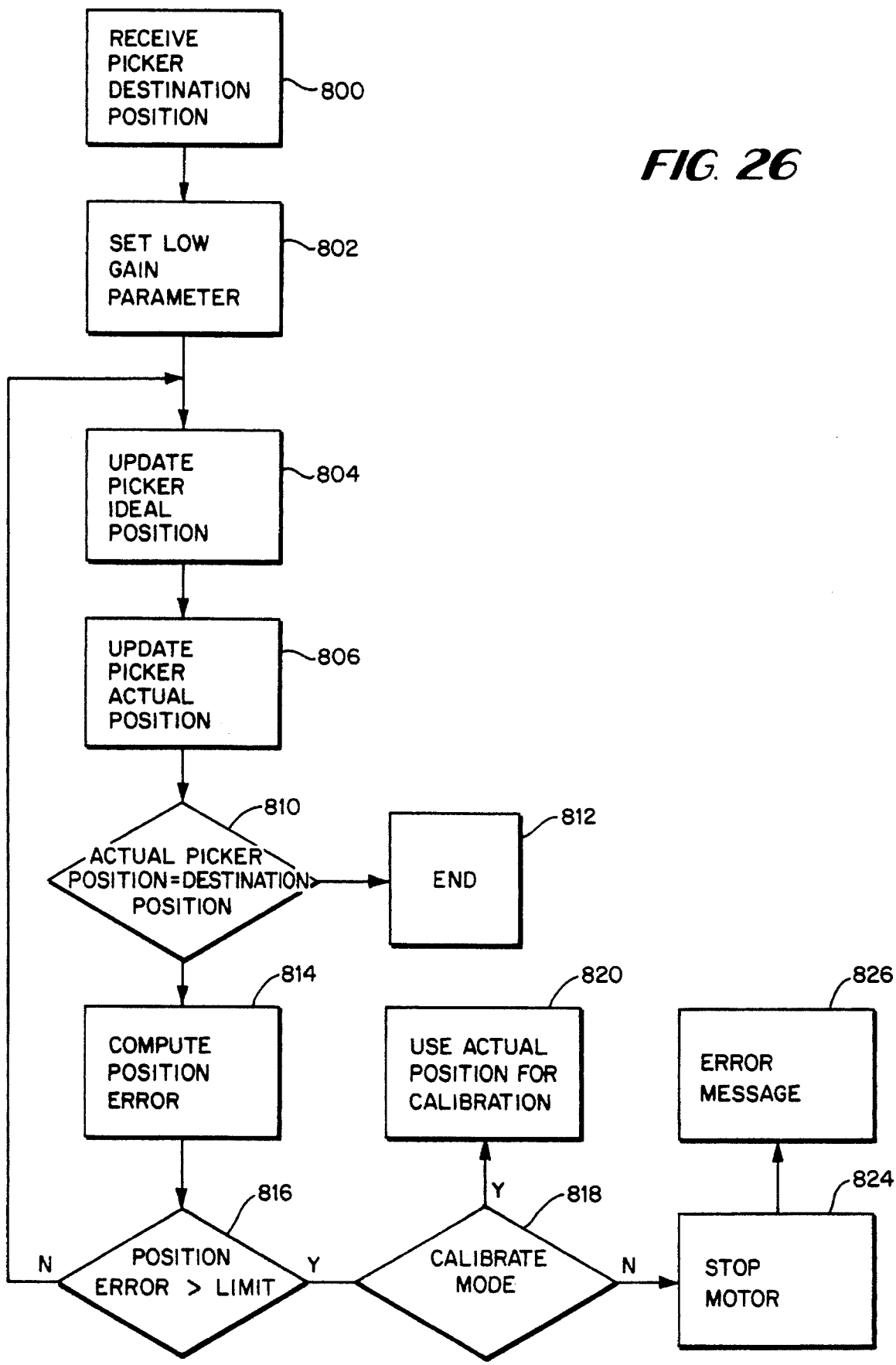
FIG. 26 is a flowchart of a picker move routine.

Steps executed by servo controller 740 in connection with a picker move routine (and illustratively a malfunction determination) are illustrated in FIG. 26. At opening step 800, servo controller 740 receives a picker destination position. At step 802 servo controller 740 sets a low gain parameter for use in the PID algorithm.

At step 804 servo controller 740 determines the instantaneous picker ideal position. At step 806 servo controller 740 determines the instantaneous actual position of picker 80. The actual position is determined at step 806 based on information supplied by X encoder 493 and Z encoder 486 (see FIGS. 25A and 25B). At step 810 servo controller 740 determines if the picker actual position is the destination position. If so, the servo routine is exited at step 812.

Assuming the destination position has not been reached, at step 814, servo controller 740 determines the position error in the manner described above. Then, at step 816, servo controller 740 determines whether the position error exceeds a predetermined limit. If the predetermined limit is not exceeded, processing loops back to step 804.

If the predetermined limit is exceeded at step 816, a determination is made at step 818 whether the servo controller 740 is executing an inventory operation (explained below). If an inventory operation is being executed, at step 820 the current actual position value is returned from the servo controller routine. Otherwise, at step 824 an error message is generated to warn the user that an unexpected obstacle has been encountered.

For sake of illustration, suppose that the picker destination position assigned at step 800 corresponds to position 5000 on a particular axis, for example the X axis. Suppose further that picker 80 encounters an unexpected immovable obstacle at, for example, position 3000 en route to position 5000. Upon encounter, servo controller 740 continues to track the picker ideal position (e.g., 3001, 3002, 3003, . . . ) as the loop beginning at step 804 is repeatedly executed, even though picker 80 is stationary. Ultimately the picker ideal position (e.g., 3300) will exceed the picker actual position by an amount greater than the predetermined limit of step 810. Assuming the library is not in an inventory mode, current to the motor will be terminated (at step 824) and a diagnostic error message will be generated (at step 826).

The picker move routine of FIG. 26 also detects a cartridge lid jam problem. It is possible for a tape cartridge dust lid to catch on a projection on the inside of a drive 320. In such case, a jammed cartridge cannot be removed by pulling it straight out of the drive 320. Library 30 must know when a cartridge lid jam exists, so that the user can be notified for manual intervention. The picker move routine of FIG. 26 provides such notification. If, at step 800, the picker 80 is directed to withdraw a cartridge from a drive 320, and the dust cover lid does jam, the picker 80 will cease movement along the Z axis (in the cartridge withdrawal direction). The position error computed at step 810 will ultimately exceed the predetermined limit (step 816), causing motor 484 to stop. The picker actual position will be returned by the picker move routine. Library main controller 701 will realize that the actual picker position is not the fully retracted position, and a cartridge lid jam warning will be generated.

OPERATION: LIBRARY INVENTORY

Figure 27:
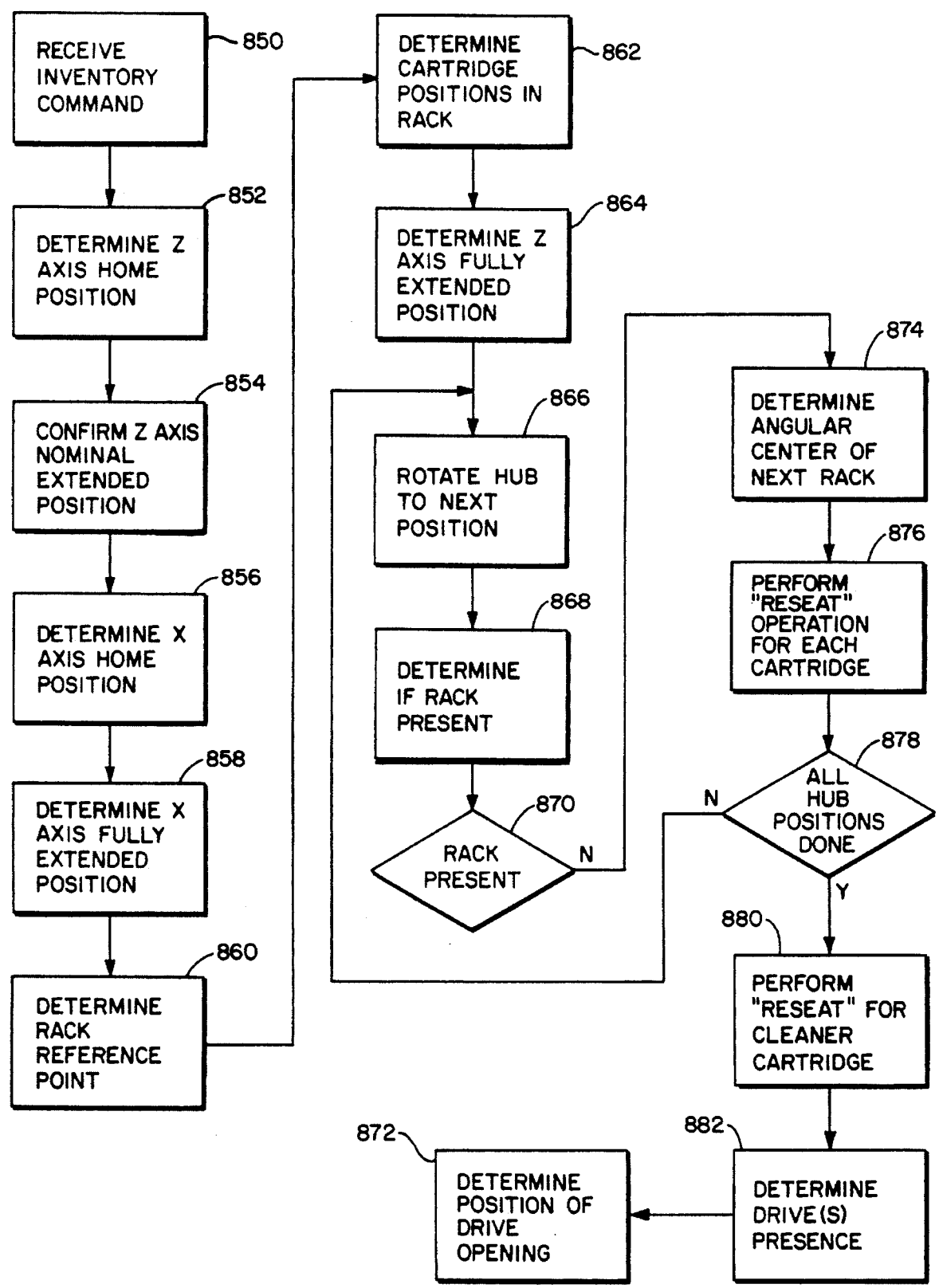
FIG. 27 is a flowchart of a library inventory operation.

Library main controller 701 utilizes the picker move routine of FIG. 26 in connection with an inventory operation. General steps involved in the library inventory operation are illustrated in FIG. 27. As will be evident in the following discussion of FIG. 27, picker 80 contacts various surfaces or stops in library 30 to determine strategic inventory positions. In connection with the determination of many of these positions, steps of the picker move routine of FIG. 26 are executed.

At step 850, library main controller 701 receives an inventory command. Then, as described in ensuing steps of FIG. 27, library main controller determines coordinate positions of various features in the library.

At step 852, main controller 701 determines a Z axis home position. As used herein, the Z axis home position is the farthest position picker 80 can travel in the Z direction toward library front panel 94. At step 852, servo controller 740 is given an extreme Z home coordinate for executing the picker move routine of FIG. 26. When picker 80 encounters a hard stop at the Z axis home position, the picker actual position along the Z axis is returned as the Z axis home position. Then, at step 854, picker 80 is directed along the Z axis in the opposite direction to a nominal extended position, shy of any cartridge position, to confirm that there is no blockage.

At step 856 library main controller 701 follows a procedure analogous to step 852 for determining the X axis home position. As used herein, the X axis home position is the lowest position picker 80 can travel in the X direction. Then, at step 858, library main controller 701 directs picker 80 to travel to an opposite extreme position along the X axis. Picker 80 encounters a hard stop prior to reaching the opposite extreme position, at which point the picker move routine returns the picker actual position at the hard stop.

At step 860 library main controller 701 determines a reference coordinate for a rack 60 mounted in the active position of hub 34. This is done by closing gripper fingers 406 to the closed position shown in FIG. 21, moving picker 80 to an X coordinate just above a nominal expected (e.g., preprogrammed) X coordinate of center rib 60C of a rack 60; moving picker 80 in the negative Z direction toward the center rib; and then lowering picker 80 (negative X direction) until picker 80 contacts a side of center rib 60C. Library main controller 701 can then determine the X direction center of center rib 60C by a predetermined offset (knowing that the center of center rib 60C is distanced by a predetermined toleranced offset from the top surface of center rib 60C. Alternatively, steps such as the foregoing can be executed to locate the bottom surface of center rib 60C, and then an average taken to locate the center of center rib 60C.

In connection with execution of step 860, if a cartridge is located in a slot immediately adjacent center rib 60C in the direction from which picker 80 approaches, it may be necessary for picker 80 to first remove the cartridge to another storage location.

Knowing the reference coordinate for rack 60, at step 862 library main controller 701 determines the ten different cartridge positions in rack 60 using predetermined offsets. For example, library main controller 701 knows the sizes of the cartridge slots in rack 60 and the tolerances thereof, and accordingly can calculate, spaced from the reference point, the position of each cartridge in the rack 60.

At step 864 library main controller 701, now knowing the positions of cartridges in rack 60, can determine the Z axis fully extended position.

After executing step 864, library main controller 701 executes a rack processing loop comprising optional steps 866, 868, and 870, as well as steps 874 through 878. Steps 866 comprise rack presence determination steps, and are conducted only for the optional embodiment which employs rack presence sensor 180 (see FIGS. 6 and 7). As indicated earlier, as hub 34 is rotated, detector trip toe 197 of rack mounts 110 having racks 60 mounted thereon interrupt detector 199. Thus, at step 866 hub 34 is rotated so that a next hub face (with its rack mount 110 and trip toe 197) is angularly aligned with detector 199. At step 868 a signal from detector 199 is read, which indicates whether a rack 60 is present on the current hub face. If, as indicated by step 870, a rack is not present, execution loops back to step 866 for the next hub face.

Assuming rack presence was confirmed at step 870, at step 874 library main controller 701 determines the angular center of the rack. Specifically, at step 874 gripper fingers 406 are opened to the open position shown in FIG. 23 and are moved toward the rack 60 along the negative Z direction. At a predetermined position along the Z direction at which the rack is located, gripper 80 pauses while hub 34 is rotated counterclockwise about its axis 36. The position at which one of the gripper fingers 406 contacts a first edge of rack 60 is noted. Then hub 34 is rotated clockwise, and the position at which the other of the gripper fingers 406 contacts a second edge of rack 60 is noted. An average of the noted positions is then taken, and used as the angular center of the hub face 52.

After the angular center has been determined, at step 876 library main controller 701 performs a "re-seat" operation for each cartridge 62 in active rack 60. At step 876 picker 80 is directed along the Z axis toward each cartridge position (calculated at step 864) for rack 60. In particular, picker 80 is translated in the Z direction toward rack 60 with gripper fingers 406 in the gripper open position of FIG. 23. At the fully extended Z axis position, for each cartridge position a reading from cartridge presence sensor 452 is checked. If a cartridge is present in its corresponding cartridge position in rack 60, feeler leg 446 will cause sensor 452 to issue a signal indicative of cartridge presence. Otherwise, the cartridge position in rack 60 is determined to be vacant. Thus, at step 876, picker 80 individually approaches each of the ten cartridge positions along the Z axis to confirm whether a cartridge is present in the respective position.

If, as a result of step 878, it is determined that all hub faces have not been check for the presence of a rack, execution loops back to step 866. Otherwise, execution jumps to step 880.

At step 880, picker 80, in similar fashion with step 876, approaches the cleaning cartridge 70 to determine its presence.

At step 882, library main controller 701 manipulates picker 80 to determine the presence of drives 320 in drive drawer rack 38. For each drive 320, picker 80 is positioned at a nominal drive opening position on the X axis, and slowly extended in the Z direction toward the target drive. If picker 80 encounters an obstruction at the plane of a drive bezel, it is assumed that a solid bezel has been installed in lieu of a drive. If no obstruction is found and the picker 80 is free to extend into a drive opening, library main controller 710 sets a flag indicating that a drive is present at the expected location. If a drive is determined not to be present at a nominal drive X axis position, no picker moves are thereafter permitted with respect to the vacant drive position.

At step 884, the drive opening position is determined more exactly, provided no cartridge is present in a drive. At step 884, picker 80 is positioned at the nominal X direction location of a target drive, and then directed to slowly approach the drive opening along the Z direction. When picker 80 is beyond the Z coordinate of a nominal drive bezel, picker 80 is directed in a predetermined position in the X direction (e.g., up or down) to contact an edge of a drive opening, thereby determining an X direction reference point for the drive opening. Alternatively, picker 80 can be moved both up and down (e.g., permitted to contact both upper and lower drive opening edges), from which an average is taken to determine a drive opening center X reference point.

It should be understood that the order of some of the steps illustrated in FIG. 27 can be varied. Further, certain positions can be determined by conventions other than those cited above. For example, an edge of rack 60 could be used as a reference point rather than central rib 60C.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A picker mechanism for selectively gripping and transporting a data storage cartridge in an automated library, the picker mechanism comprising:

a picker frame;

a pair of gripper fingers pivotally mounted to the picker frame, each gripper finger having a portion thereof configured to engage a data storage cartridge;

a travelling carriage member;

a path-defining member which defines a displacement path along which the carriage member travels, the path-defining member being mounted to the picker frame;

a motor connected to the path-defining member for driving the carriage member along the path-defining member;

a first biasing spring connected between one of the fingers and the frame for exerting a first biasing force on a first of the pair of gripper fingers in a direction toward the displacement path and a second biasing spring connected between the other finger and the frame for exerting a second biasing force on a second of the pair of gripper fingers in a direction toward the displacement path;

a pair of linkage elements, each linkage element being attached to the carriage member and to a corresponding one of the gripper fingers;

a finger open sensor mounted to the frame for determining when the carriage member is in a first position along the displacement path, the pair of gripper fingers being pivoted to a gripper open position at the first position;

a cartridge presence sensor mounted to the frame for determining when the carriage member is in a second position along the displacement path, the pair of gripper fingers being pivoted in the second position to engage the data cartridge with the first biasing force and the second biasing force;

a controller connected to the finger open sensor and to the cartridge presence sensor which actuates the motor to drive the carriage member to a third position along the displacement path, the pair of gripper fingers being pivoted in the third position to a cartridge shove position.

2. The picker mechanism of claim 1, wherein a first end of each of the linkage elements is pivotally attached to the carriage member and a second end of each linkage element is pivotally attached to one of the fingers.

3. The picker mechanism of claim 1, wherein the picker frame comprises a frame first half shell member, the frame first half shell member having all the following mounted thereon:

the path-defining member;

the motor;

the pair of gripper fingers; and the first biasing spring and the second biasing spring.

4. The picker mechanism of claim 3, wherein the frame first half shell member has the finger open sensor mounted thereon, and wherein the carriage member has a sensor trip means mounted thereon.

5. The picker mechanism of claim 3, wherein the picker frame further comprises a frame second half shell member which mates with the frame first half shell member to substantially enclose at least the following:

the path-defining member;

the motor;

the pair of gripper fingers; and the first biasing spring and the second biasing spring.

6. A picker mechanism of claim 1, wherein the second position along the displacement path is intermediate the first position along the displacement path and the third position along the displacement path.

7. A picker mechanism of claim 1, wherein in the third position the gripper fingers are spread apart by a distance less than a engagement dimension of the data storage cartridge.

* * * * *